US012617079B2

(12) United States Patent
Ponnappan et al.

(10) Patent No.: US 12,617,079 B2
(45) Date of Patent: May 5, 2026

(54) ROBOTICS SYSTEM FOR VERIFICATION AND VALIDATION OF SMART CONNECTED HMI DEVICES AND METHOD THEREOF

(71) Applicant: SGBI Inc., Sunnyvale, CA (US)

(72) Inventors: Aronin Ponnappan, Alappuzha (IN);
Akhil Asokan, Alappuzha (IN); Asif Dadamiya Ismail, Palakkad (IN);
Premkumar Sivankutty,
Pathanamthitta (IN); Ann Mary Sebastian, Ernakulam (IN); Rony Augustian, Cochin (IN)

(73) Assignee: SGBI Inc., Sunnyvale, CA (US)

( * ) Notice: Subject to any disclaimer, the term of this patent is extended or adjusted under 35 U.S.C. 154(b) by 224 days.

(21) Appl. No.: 18/626,004

(22) Filed: Apr. 3, 2024

(65) Prior Publication Data

US 2025/0312913 A1     Oct. 9, 2025

(51) Int. Cl.
*B25J 9/16*          (2006.01)
*B25J 15/00*         (2006.01)
(52) U.S. Cl.
CPC ............. *B25J 9/161* (2013.01); *B25J 9/1615* (2013.01); *B25J 9/1697* (2013.01); *B25J 15/0009* (2013.01)
(58) Field of Classification Search
CPC ...... B25J 9/161; B25J 19/023; B25J 15/0009; B25J 9/1615; G05B 2219/45089
See application file for complete search history.

(56) References Cited

U.S. PATENT DOCUMENTS

| | | |
|---|---|---|
| 7,658,119 B2 | 2/2010 | Loeb et al. |
| 7,878,075 B2 | 2/2011 | Johansson et al. |
| 8,181,540 B2 | 5/2012 | Loeb et al. |

(Continued)

FOREIGN PATENT DOCUMENTS

| | | |
|---|---|---|
| EP | 2246788 A1 | 11/2010 |
| EP | 1789945 B1 | 7/2012 |

(Continued)

OTHER PUBLICATIONS

Timpea, S., et al., "Touch Screen Tester Device End-Effector," Materiale Plastice, vol. 56, No. 2, 2019, pp. 445-448.

(Continued)

*Primary Examiner* — Wade Miles
*Assistant Examiner* — Mohammed Yousef Abuelhawa
(74) *Attorney, Agent, or Firm* — Rahman LLC

(57)            ABSTRACT

Disclosed is a robotic system and method designed for the verification and validation of smart connected Human-Machine Interface (HMI) devices. The robotic system integrates a multi-finger modular robotic module, a haptic module, a finger actuator, vision cameras, vision lights, a finger rotary module, a Cartesian robotic arm, an onboard user interface, and an L-shaped door. The method involves replicating human finger interactions, simulating touch sensations on a device under test (DUT), ensuring continuous and reliable operation, utilizing vision cameras for navigation and verification, optimizing vision with controlled lighting, positioning cameras strategically, executing various tasks with a robotic arm, and facilitating user interaction through an onboard interface.

20 Claims, 22 Drawing Sheets

(56) References Cited

U.S. PATENT DOCUMENTS

| | | | |
|---|---|---|---|
| 8,272,278 | B2 | 9/2012 | Loeb et al. |
| 8,576,182 | B2 | 11/2013 | Hristov |
| 9,080,918 | B2 | 7/2015 | Fishel et al. |
| 9,477,909 | B2 | 10/2016 | Fishel et al. |
| 9,652,077 | B2 | 5/2017 | Jenkinson |
| 9,729,868 | B2 | 8/2017 | Jokinen et al. |
| 9,787,978 | B1 | 10/2017 | Jokinen et al. |
| 9,807,384 | B1 | 10/2017 | Jokinen et al. |
| 9,990,874 | B2 | 6/2018 | Aimonen et al. |
| 10,140,539 | B2 | 11/2018 | Sami et al. |
| 2009/0265035 | A1 | 10/2009 | Jenkinson et al. |
| 2011/0251719 | A1 | 10/2011 | Lien et al. |
| 2012/0146956 | A1 | 6/2012 | Jenkinson |
| 2012/0280934 | A1 | 11/2012 | Ha et al. |
| 2013/0345864 | A1 | 12/2013 | Park |
| 2014/0111484 | A1 | 4/2014 | Welch et al. |
| 2015/0138162 | A1* | 5/2015 | Leigh .................... G09G 3/006 |
| | | | 345/178 |
| 2016/0025615 | A1 | 1/2016 | Fishel et al. |
| 2016/0320889 | A1 | 11/2016 | Jenkinson |
| 2017/0339335 | A1 | 11/2017 | Kuokkanen et al. |
| 2018/0089522 | A1 | 3/2018 | Sami et al. |
| 2018/0313890 | A1* | 11/2018 | Wolff ................. G01R 31/2893 |
| 2018/0364131 | A1 | 12/2018 | Jokinen et al. |
| 2021/0148975 | A1* | 5/2021 | Strickling ................ B25J 11/00 |
| 2021/0409678 | A1* | 12/2021 | Birklbauer ............. H04N 23/61 |
| 2022/0342785 | A1 | 10/2022 | Leinonen et al. |

FOREIGN PATENT DOCUMENTS

| | | | |
|---|---|---|---|
| EP | 3093767 | A1 | 11/2016 |
| IN | 453718 | | 10/2019 |
| WO | 2024141699 | A1 | 7/2024 |
| WO | 2024141701 | A1 | 7/2024 |
| WO | 2024141705 | A1 | 7/2024 |

OTHER PUBLICATIONS

Tactile Automation, Inc., Touch Screen Testing using Robot : Tactile Automation, https://www.youtube.com/watch?v=J5SMfDDCBe0, Mar. 19, 2015, Video + 2 pages.

Optofidelity, OptoFidelity™ End-to-End Touch Up & Down Latency Tool, https://www.youtube.com/watch?v=mZ_m4F3HySA, Nov. 12, 2018, Video + 2 pages.

OptoFidelity, Functional testing with OptoFidelity HSUF test system, https://www.youtube.com/watch?v=Vh4zteNn_l4, Oct. 29, 2013, Video + 2 pages.

OptoFidelity, Touch & Test Robot with WatchDog UI Performance Test System, https://www.youtube.com/watch?v=029RcSIOurM, Dec. 18, 2012, Video + 2 pages.

OptoFidelity, OptoFidelity Touch Panel Performance Tester, https://www.youtube.com/watch?v=q_sxn1hZu78, Oct. 16, 2012, Video + 2 pages.

* cited by examiner

300

400

500

600

700

800

1000

1100

1300

1700

1800

1900

Figure 22:
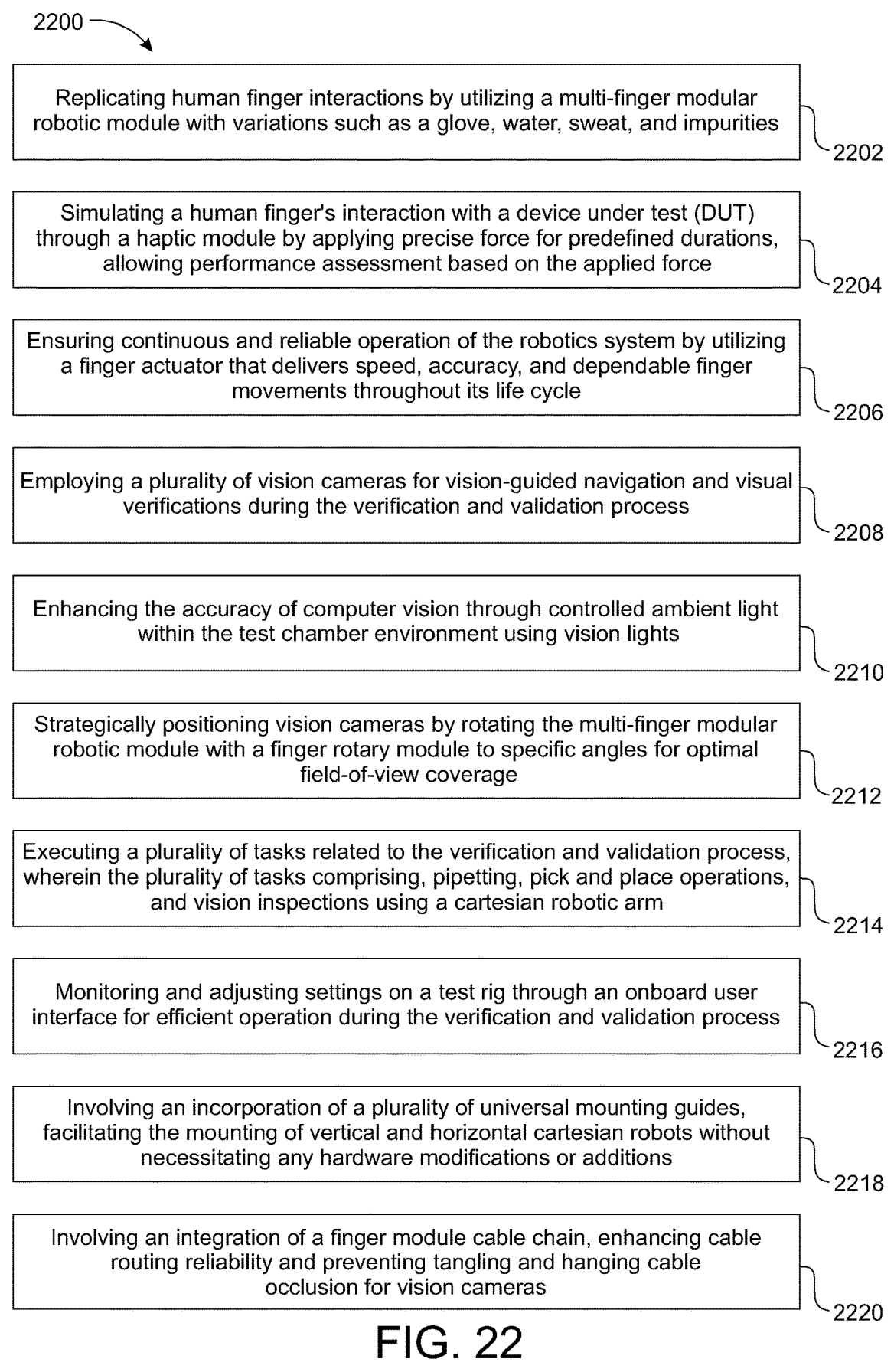

2200

Replicating human finger interactions by utilizing a multi-finger modular robotic module with variations such as a glove, water, sweat, and impurities

2202

Simulating a human finger's interaction with a device under test (DUT) through a haptic module by applying precise force for predefined durations, allowing performance assessment based on the applied force

2204

Ensuring continuous and reliable operation of the robotics system by utilizing a finger actuator that delivers speed, accuracy, and dependable finger movements throughout its life cycle

2206

Employing a plurality of vision cameras for vision-guided navigation and visual verifications during the verification and validation process

2208

Enhancing the accuracy of computer vision through controlled ambient light within the test chamber environment using vision lights

2210

Strategically positioning vision cameras by rotating the multi-finger modular robotic module with a finger rotary module to specific angles for optimal field-of-view coverage

2212

Executing a plurality of tasks related to the verification and validation process, wherein the plurality of tasks comprising, pipetting, pick and place operations, and vision inspections using a cartesian robotic arm

2214

Monitoring and adjusting settings on a test rig through an onboard user interface for efficient operation during the verification and validation process

2216

Involving an incorporation of a plurality of universal mounting guides, facilitating the mounting of vertical and horizontal cartesian robots without necessitating any hardware modifications or additions

2218

Involving an integration of a finger module cable chain, enhancing cable routing reliability and preventing tangling and hanging cable occlusion for vision cameras

ROBOTICS SYSTEM FOR VERIFICATION AND VALIDATION OF SMART CONNECTED HMI DEVICES AND METHOD THEREOF

TECHNICAL FIELD

The specification is generally directed toward a complete robotics platform for verification and validation of smart connected Human-Machine Interface (HMI) devices. More particularly, but not limited to, a robotics system and method for verification and validation of one or more smart connected human-machine interface (HMI) devices.

DESCRIPTION OF THE RELATED ART

Companies, particularly in automotive in-vehicle infotainment, consumer electronics (smart appliances, smart meter systems, etc.), Mission-critical medical equipment, Avionics cockpit & inflight entertainment systems, and Smart gadget manufacturers (smartphones, tablets & wearable devices), face significant challenges with product recalls and quality-related lawsuits due to issues in their human-machine interfaces (HMI). These interfaces encompass touch screens, combinations of screens & buttons, knobs, rocker switches, voice interfaces, and hand gesture feedback. The primary reason for these issues is the manual, expensive, ineffective, and error-prone nature of conventional HMI hardware-in-loop testing. According to the World Quality Report by Capgemini, a significant percentage of industries lack suitable automation tools, and skilled labor, and face challenges with manual efforts in testing, contributing to substantial overhead costs.

An example of a robotic device is recited in U.S. Pat. No. 9,652,077B2. This patent discloses a touch-screen testing platform may be used to perform repeatable testing of a touch-screen-enabled device using a robotic device tester and a controller. The platform may use various types of conductive tips that engage the touch screen, thereby simulating human behavior. The platform may perform multitouch operations by employing multiple tips that can engage the touch screen simultaneously. The tips activate a touch screen from at least a trace of conductive coating located on nonconductive components of the robotic device tester.

Another example of a touch screen testing platform for use with a robotic device is recited in a patent application US20160320889A1. This patent discloses a touchscreen testing platform may be used to engage a dynamically positioned target feature being displayed on a touchscreen-enabled device during a testing protocol. The platform may record imagery displayed by the touchscreen device and then analyze the imagery to locate the target feature within a reference coordinate system. The platform may recognize that the target feature is missing from the imagery and respond by causing the touch screen device to scroll through a command menu and/or toggle through virtual screens. Once located, the platform may instruct a robotic device tester to select the target feature by contacting the touch screen at the identified location using a conductive tip designed to simulate a user's fingertip. Before running a test, the camera may be focused to a point that is offset from the display screen of the touchscreen device.

Various attempts to address these issues have been made, but prior art products have significant drawbacks. There is a lack of standardized equipment, modularity, and platform independence in existing tools, along with shortcomings in smart finger technology, multi-finger modules, robot arm design, safety features, and remote operating capabilities.

Furthermore, the market lacks a specialized rig that accommodates larger test devices, provides mechanical mounting capabilities for various robots, and supports a range of functionalities crucial for HMI testing automation.

These challenges highlight the need for a robotic system and method to address the shortcomings of current HMI testing methods, ensuring efficient verification and validation of smart connected HMI devices in various industries.

Thus, in view of the above, there is a long-felt need in the industry to address the aforementioned deficiencies and inadequacies.

Further limitations and disadvantages of conventional approaches will become apparent to one of skill in the art through the comparison of described systems with some aspects of the present disclosure, as set forth in the remainder of the present application and with reference to the drawings.

SUMMARY

An aspect of the present invention relates to a robotic system and method designed for the verification and validation of smart connected Human-Machine Interface (HMI) devices.

The system integrates a multi-finger modular robotic module, a haptic module, a finger actuator, vision cameras, vision lights, a finger rotary module, a Cartesian robotic arm, an onboard user interface, and an L-shaped door. The multi-finger modular robotic module replicates bare human fingers, and one or more of: human fingers with glove, water, sweat, and impurities. The haptic module simulates a human finger over a device under test (DUT) by applying a precise force required for a predefined duration and determining the performance of the DUT based on the precise force. The finger actuator provides speed, accuracy, and reliable finger movement throughout a life cycle which makes the robotics system capable of running continuously. The vision cameras are configured for vision-guided navigation and visual verifications. The vision lights are configured for the vision cameras to control the ambient light for better accuracy for a computer vision as well as controllability in a test chamber environmental light. The finger rotary module rotates the multi-finger modular robotic module to a specific angle and aesthetically positions the vision cameras on a specific region for the maximum field of view coverage. The cartesian robotic arm is compatible with one or more of the multi-finger modular robotic module, a plurality of pipetting modules, a pick and place module, a vision inspection module, or a combination thereof. The onboard user interface enables monitoring and adjustment of various settings on a test rig. The L-shaped door provides wide openings to the robotics system providing operating access to a user to mount a test device as well as the opaque doors block out external light to enhance computer vision accuracy and maintain controlled ambient lighting.

In an aspect, the robotic system further includes a plurality of universal mounting guides for vertical and horizontal cartesian robots mounting without any hardware change or additions.

In an aspect, the robotic system further includes a finger module cable chain to provide reliability in cable routing and prevent tangling and hanging cable occlusion for the vision cameras.

In an aspect, the robotic system further includes a homing module to provide a positional accuracy and repeatability for the finger actions.

In an aspect, the robotic system further includes a status indicator using multicolor light sources positioned on the top of the test rig.

In an aspect, the robotic system further includes a heavy-duty rig table to provide one or more of: a solid mounting provision for the robot rig; cable additional test support equipment such as API controllable power supply, signal generators, analyzers; a multi-functionality anti-vibrating caster wheel with manual thumb wheel nut open-ended wrench for leveling adjustment and on-premise test system movements; an inbuilt power distribution unit to support any standard power socket along with electrical isolator unit; a wide open front and back door for flexibility of device mounting, organizing, and cable routing; a plurality of customizable cabling racks and grommets; and an adjustable rack-mountable equipment mounting rail.

In an aspect, the robotic system further includes a plurality of rack mounting rack plates to provide convenient positioning of a plurality of test support devices.

In an aspect, the robotic system further includes a plurality of multi-functional anti-vibrating caster wheels to provide solid placement of the test device and its manual thumb wheel nut open-ended wrench helps levelling adjustment.

In an aspect, the robotic system further includes an emergency stop to halt the robotic system manually if any unforeseen issues happen to the DUT of the equipment.

In an aspect, the robotic system further includes a test device barcode printer to create a unique barcode/QR code for each test device while creating the device library using the software suite.

In an aspect, the robotic system further includes a selective compliance assembly robot arm (SCARA) with a single finger module configured for an HMI testing automation to accommodate the plurality of end effectors.

In an aspect, the robotic system further includes a plurality of manipulator connectors to connect the robotic manipulator to the test rig.

In an aspect, the robotic system further includes a SCARA robot with a two-finger module for HMI testing automation to accommodate the plurality end effectors.

In an aspect, the robotic system further includes a robot height adjustment module to adjust the operating height of the robots with respect to the DUT bed to mount various types of DUTs to the test rig.

In an aspect, the robotic system further includes a voice assistant test simulator to simulate humankind of voice feedback for voice assistance testing as well as capture voice response from the test device.

In an aspect, the robotic system further includes an in-built DUT power supply for the DUTs (test device).

In an aspect, the robotic system further includes a local camera mounting bracket for the SCARA to mount an additional vision camera to monitor the changes happening in the test device.

Another aspect of the present disclosure relates to a method for verifying and validating smart connected Human-Machine Interface (HMI) devices using a robotic system. The method includes a step of replicating human finger interactions by utilizing a multi-finger modular robotic module with variations such as a glove, water, sweat, and impurities. The method includes a step of simulating a human finger's interaction with a device under test (DUT) through a haptic module by applying precise force for predefined durations, allowing performance assessment based on the applied force. The method includes a step of ensuring continuous and reliable operation of the robotics system by utilizing a finger actuator that delivers speed, accuracy, and dependable finger movements throughout its life cycle. The method includes a step of employing a plurality of vision cameras for vision-guided navigation and visual verifications during the verification and validation process. The method includes a step of enhancing the accuracy of computer vision through controlled ambient light within the test chamber environment using vision lights. The method includes a step of strategically positioning vision cameras by rotating the multi-finger modular robotic module with a finger rotary module to specific angles for optimal field-of-view coverage. The method includes a step of executing a plurality of tasks related to the verification and validation process. The plurality of tasks comprising, pipetting, pick and place operations, and vision inspections using a Cartesian robotic arm. The method includes a step of monitoring and adjusting settings on a test rig through an onboard user interface for efficient operation during the verification and validation process. The method includes a step of involving an incorporation of a plurality of universal mounting guides, facilitating the mounting of vertical and horizontal Cartesian robots without necessitating any hardware modifications or additions. The method further includes a step of involving an integration of a finger module cable chain, enhancing cable routing reliability and preventing tangling and hanging cable occlusion for vision cameras.

In an embodiment, an end-to-end smart robotic system is provided for automating the testing of connected Human Machine Interface HMI devices such as Automotive infotainment, Consumer Electronics (smart appliances, smart meter system, etc), Mission critical medical equipment, Avionics cockpit & inflight entertainment system and Smart gadget manufacturers (smartphone, tablets & wearable device).

Accordingly, one advantage of the present invention is that the robotic system and method create a modular robotic multi-finger module in conjunction with a computer vision system. This module aims to construct diverse test devices usable in various orientations (ie: vertical/horizontal or slanted). This will help verification and validation of smart connected Human-Machine Interface (HMI) devices in various industry segments those who demanding testing in various orientations. For example, an automotive infotainment system (car stereos) should test both vertically, horizontally, or at any angle exactly like how it fits into a car or motorcycle whereas most of the medical equipment should operate vertically (HMI facing towards a standing person).

Accordingly, another advantage of the present invention is that it provides a multi-finger stylus for applying defined pressure on the surface and simultaneously measures different parameters including vibration happening at the area where the pressure is applied.

Accordingly, another advantage of the present invention is that the system replicates scenarios for finger hovering where there is no physical contact made between the stylus and the device.

Accordingly, another advantage of the present invention is that the universal mounting provision is provided for the multi-finger stylus that can be fit into multiple types of robots such as SCARA robots, Articulated robots, or cartesian robot arms that can be operated both in vertical and horizontal orientation with or without computer vision.

Accordingly, another advantage of the present invention is that the integrated computer/machine vision system is utilized for recording and evaluating the characteristics of the screen, hard buttons/switches, and content within the screen or in the HMI control elements.

Accordingly, another advantage of the present invention is that it can change the finger type with more than 30 types of stylus tips indicating different types of human finger sizes in different countries.

Accordingly, another advantage of the present invention is that it provides a complete platform for HMI testing automation instead of test automation components.

Accordingly, another advantage of the present invention is that it provides the apparatus/device along with the software can replicate real human test scenarios at normal and controlled environmental conditions to ensure the reliability & quality of the device under test (DUT).

Accordingly, another advantage of the present invention is that the stylus is used for applying defined pressure on the surface and simultaneously measuring different parameters including vibration happening at the area where the pressure is applied.

Accordingly, another advantage of the present invention is that it provides an inbuilt robot HMI system that monitors the test automation system health, safety alerts, and SOP violations and provides advance maintenance alerts for uninterrupted cycles of operation.

Accordingly, another advantage of the present invention is that it provides a robotic system for the verification and validation of smart connected Human-Machine Interface (HMI) devices. In an embodiment, the robotic system may include a cloud server; a user device; two or more imaging units (computer vision camera systems); a robotic controller; an onboard master controller; an onboard computing device; a vision processor; a general-purpose input/output (GPIO); an accessory expansion unit; one or emergency switch modules; built-in HMI screen with control buttons; universal test device mounting plate and it's mounting jigs; an adjustable and customizable test device power supply; an accessory expansion port; and a robot arm. The robot arm includes a touch module with one or more active fingers; a robot height adjustment module; one or more LED indications; one or more sensors; one or more on-device teach buttons; and an in-built local camera with flash units/ambiance light with controls.

Accordingly, another advantage of the present invention is that the system is capable of automatically changing between various types of stylus for replicating different test scenarios like making the touch with a glove, making touch with sweaty hands, making touch with different sizes of fingers, etc.

Accordingly, another advantage of the present invention is that it provides a piece of robotic equipment to simulate various other human input actions like hand movement, temperature change, gripping, glove mode, water drop test, liquid spill test, vibrations, speech, etc.

Other embodiments and advantages will become readily apparent to those skilled in the art upon viewing the drawings and reading the detailed description hereafter, all without departing from the spirit and the scope of the disclosure. The drawings and detailed descriptions presented are to be regarded as illustrative in nature and not in any way as restrictive.

BRIEF DESCRIPTION OF THE DRAWINGS

The accompanying drawings illustrate the embodiments of systems, methods, and other aspects of the disclosure. Any person of ordinary skill in the art will appreciate that the illustrated element boundaries (e.g., boxes, groups of boxes, or other shapes) in the figures represent an example of the boundaries. In some examples, one element may be designed as multiple elements, or multiple elements may be designed as one element. In some examples, an element shown as an internal component of one element may be implemented as an external component in another and vice versa. Furthermore, the elements may not be drawn to scale. Reference numerals may be selectively repeated across images for clarity or emphasis.

Various embodiments will hereinafter be described in accordance with the appended drawings, which are provided to illustrate, not limit, the scope, wherein similar designations denote similar elements, and in which:

FIG. 22 illustrates a flowchart of a method for verification and validation of one or more smart connected human-machine interface (HMI) devices, in accordance with one or more example embodiments.

DETAILED DESCRIPTION

Figure 1:
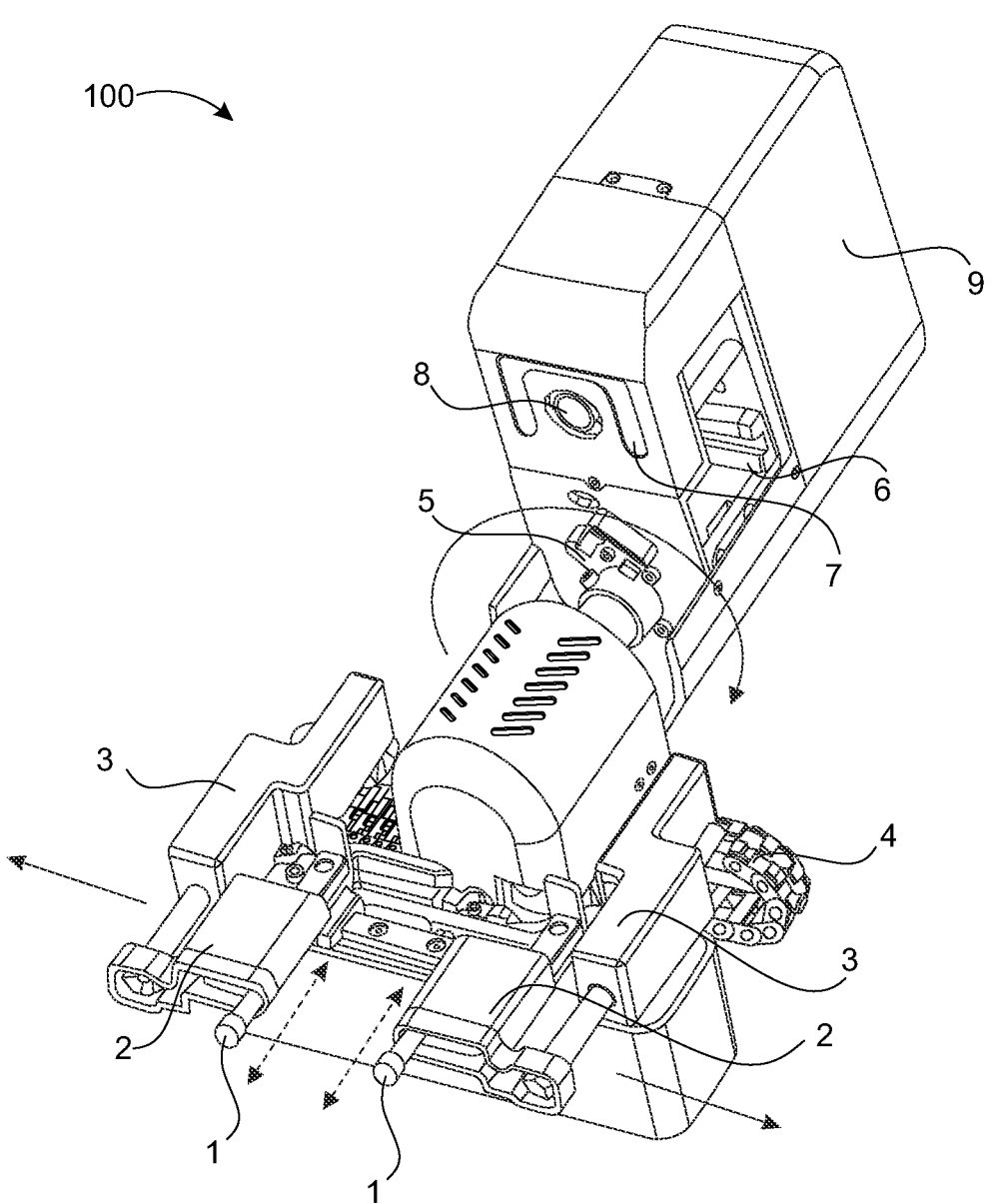
FIG. 1 illustrates a perspective view of a multi-finger modular robotic module with a vision system that can fit into various types of robots for verification and validation of smart connected Human-Machine Interface (HMI) devices, in accordance with one or more example embodiments.

The present description is best understood with reference to the detailed figures and description set forth herein. Various embodiments of the present system and method have been discussed with reference to the figures. However, those skilled in the art will readily appreciate that the detailed description provided herein with respect to the figures is merely for explanatory purposes, as the present system and method may extend beyond the described embodiments. For instance, the teachings presented and the needs of a particular application may yield multiple alternative and suitable approaches to implement the functionality of any detail of the present systems and methods described herein. Therefore, any approach to implement the present system and method may extend beyond certain implementation choices in the following embodiments.

According to an embodiment herein, the methods of the present invention may be implemented by performing or completing manually, automatically, and/or a combination of thereof. The term "method" refers to manners, means, techniques, and procedures for accomplishing any task including, but not limited to, those manners, means, techniques, and procedures either known to the person skilled in the art or readily developed from existing manners, means, techniques and procedures by practitioners of the art to which the present invention belongs. The persons skilled in the art will envision many other possible variations within the scope of the present system and method described herein.

To address various issues and drawbacks, the present disclosure provides a robotics-based apparatus, system, process, and methods designed for the verification and validation of connected Human Machine Interface (HMI) devices. This encompasses a broad range, including Automotive in-vehicle infotainment, Consumer Electronics, Mission-critical medical equipment, Avionics cockpit, and Smart gadgets. The robotics system (commercialized as QUACO (Quality Assurance Companion)) integrates hardware and software components capable of replicating human hand interactions, vision, and cognitive processes, along with cloud connectivity for efficient data management and sharing.

The robotic arm's smart fingers mimic human-like touches with controlled pressure, measuring haptic feedback from surfaces. The intelligent vision camera system replicates a superhuman eye, assessing screen content, patterns, and transition times, and detecting damages such as dead pixels or scratches. The QUACO software suite, driven by AI/ML, acts as an intelligent brain, generating test scripts, learning from outputs, predicting errors, and organizing test cases and results effectively.

Cloud connectivity enhances data management, allowing seamless sharing of key test data among product lifecycle stakeholders. By employing various types of fingers to replicate human hands, standardizing HMI testing processes, and integrating smart vision and cloud-connected software, QUACO significantly reduces testing cycle times and costs, enhancing product quality and accelerating time-to-market for companies developing such products.

The present invention specifically focuses on the verification and validation of In-Vehicle Infotainment units and smart connected devices through a robotics-aided test automation tool for HMI testing and validation.

FIG. 1 illustrates a perspective view of a multi-finger modular robotic module 100 with a vision system that can fit into various types of robots for verification and validation of smart connected Human-Machine Interface (HMI) devices, in accordance with one or more example embodiments. FIG. 1 is explained in conjunction with FIG. 2-FIG. 21. In an embodiment, the multi-finger modular robotic module 100 is a robotic system 100 that includes a haptic module 2, a finger actuator 3, vision cameras 8, vision lights 7, a finger rotary module 9, a Cartesian robotic arm 11, an onboard user interface 12, and an L-shaped door 35. The multi-finger modular robotic module 100 replicates bare human fingers, and one or more of: human fingers with glove, water, sweat, and impurities. The haptic module 2 simulates a human finger over a device under test (DUT) by applying a precise force required for a predefined duration and determining the performance of the robotics system based on the precise force and haptic feedback. The finger actuator 3 provides speed, accuracy, and reliable finger movement throughout a life cycle which makes the robotics system capable of running continuously. The vision cameras 8 are configured for vision-guided navigation and visual verifications. The vision lights 7 are configured for the vision cameras 8 to control the ambient light for better accuracy for a computer vision as well as controllability in a test chamber environmental light. The finger rotary module 9 rotates the multi-finger modular robotic module 100 to a specific angle and aesthetically positions the vision cameras 8 on a specific region for the maximum field of view coverage. The cartesian robotic arm 11 is compatible with one or more of the multi-finger modular robotic module 100, a plurality of pipetting modules, a pick and place module, a vision inspection module, or a combination thereof. The onboard user interface 12 enables monitoring and adjustment of various settings on a test rig. The L-shaped door 35 provides wide openings to the robotics system providing operating access to a user to mount a test device.

In an embodiment, the robotic system 100 further includes a plurality of universal mounting guides 6 for vertical and horizontal cartesian robots mounting without any hardware change or additions. The robotic system 100 further includes a finger module cable chain 4 to provide reliability in cable routing and prevent tangling and hanging cable occlusion for the vision cameras 8. In an embodiment, the robotic system 100 further includes a homing module 5 to provide a positional accuracy and repeatability for the finger actions. The robotic system 100 further includes a status indicator 10 using multicolor light sources positioned on the top of the test rig. The robotic system 100 further includes a heavy-duty rig table 13 to provide one or more of: a solid mounting provision for the robot rig; cable additional test support equipment such as API controllable power supply, signal generators, analyzers; a multi-functionality anti-vibrating caster wheel with manual thumb wheel nut open-ended wrench for leveling adjustment and on-premise test system movements; an inbuilt power distribution unit to support any standard power socket along with electrical isolator unit; a wide open front and back door for flexibility of device mounting, organizing, and cable routing; a plurality of customizable cabling racks and grommets; and an adjustable rack-mountable equipment mounting rail.

The robotic system 100 further includes a plurality of rack mounting rack plates 14 to provide convenient positioning of a plurality of test support devices. In an embodiment, the robotic system 100 further includes a plurality of multi-functional anti-vibrating caster wheels 15 to provide solid placement of the test device and its manual thumb wheel nut open-ended wrench helps levelling adjustment. In an embodiment, the robotic system 100 further includes an emergency stop 16 to halt the robotic system 100 manually if any unforeseen issues happen to the DUT of the equipment. The robotic system 100 further includes a test device barcode printer 17 to create a unique barcode/QR code for each test device while creating the device library using the software suite. The robotic system 100 further includes a selective compliance assembly robot arm (SCARA) with a single finger module 49 configured for an HMI testing automation to accommodate the plurality of end effectors. In an embodiment, the robotic system 100 further includes a plurality of manipulator connectors 38 to connect the robotic manipulator to the test rig. The robotic system 100 further includes a SCARA robot with a two-finger module 41 for HMI testing automation to accommodate the plurality end effectors.

In an embodiment, the robotic system 100 further includes a robot height adjustment module 42 to adjust the operating height of the robots with respect to the DUT bed to mount various types of DUTs to the test rig. The robotic system 100 further includes a voice assistant test simulator 43 to simulate humankind of voice feedback for voice assistance testing as well as capture voice response from the test device. In an embodiment, the robotic system 100 further includes an in-built DUT power supply 44 for the DUTs (test device). The robotic system 100 further includes a local camera mounting bracket 46 for the SCARA to mount an additional vision camera to monitor the changes happening in the test device.

Figure 2:
FIG. 2 illustrates a perspective view of the complete test bench setup for verification and validation of smart connected Human-Machine Interface (HMI) devices, in accordance with one or more example embodiments.
Figure 2:
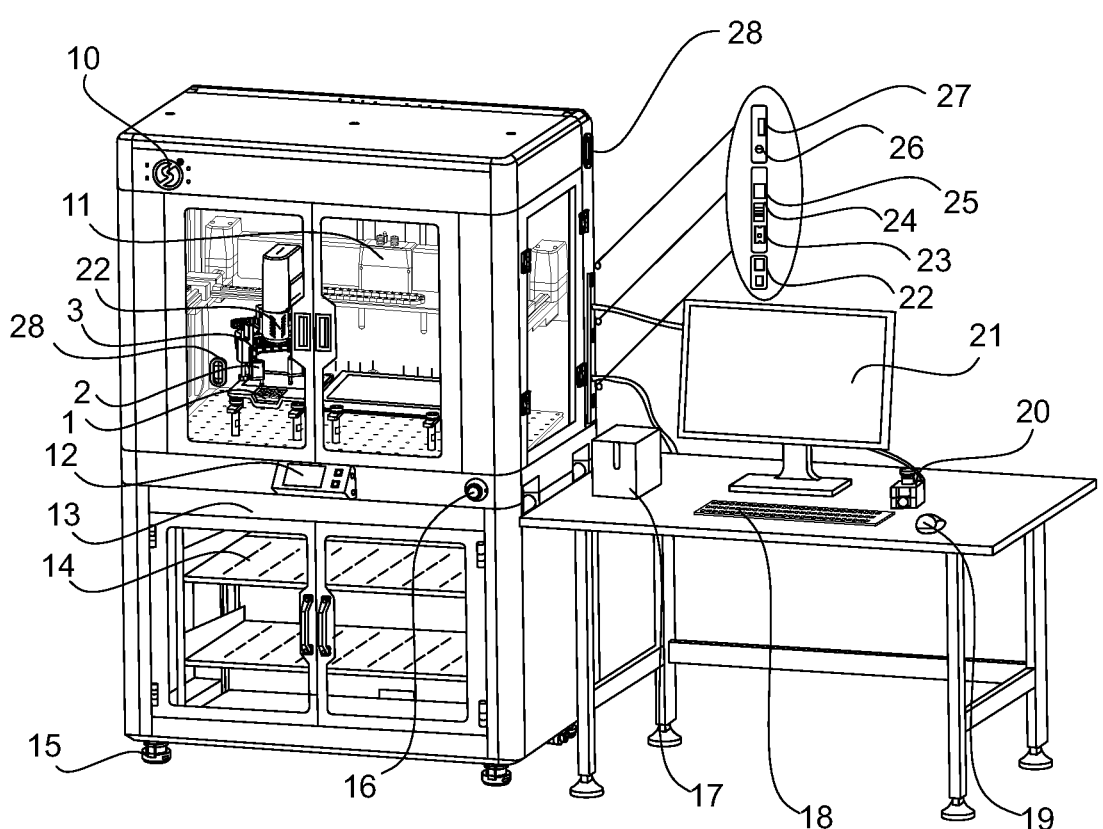
Figure 3:
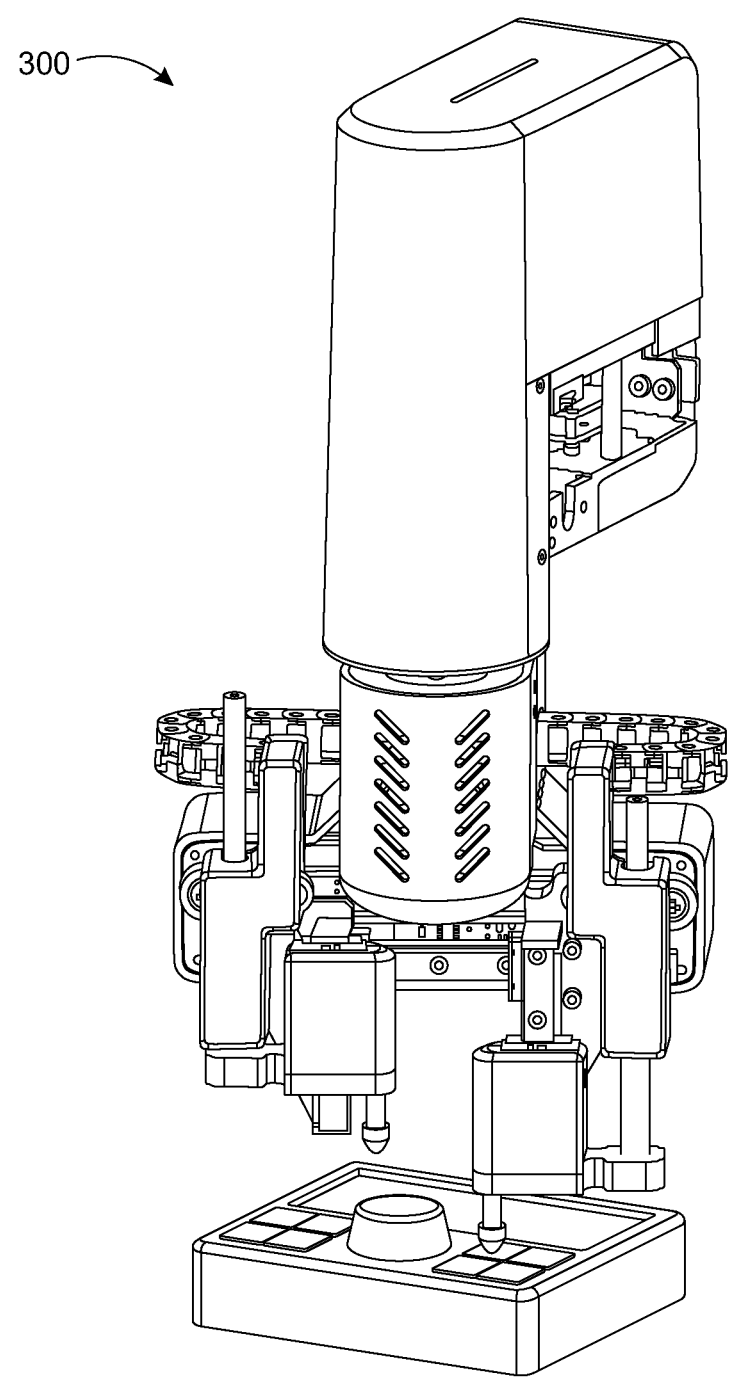
FIG. 3 illustrates a perspective view of the modular robotic multi-finger module operating hard buttons/keypads in horizontal orientation, in accordance with one or more example embodiments.
Figure 4:
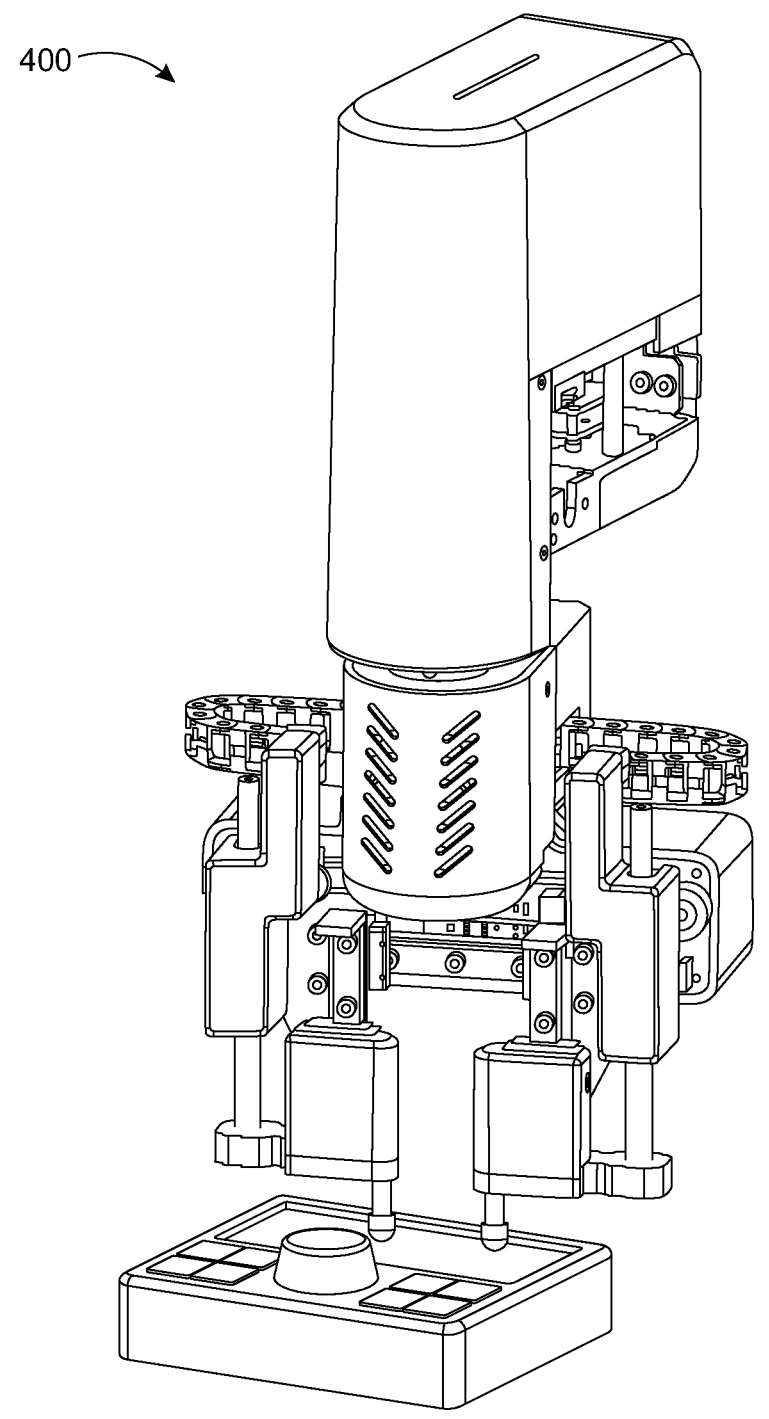
FIG. 4 illustrates a perspective view of the modular robotic multi-finger module operating touch screens in horizontal orientation, in accordance with one or more example embodiments.
Figure 5:
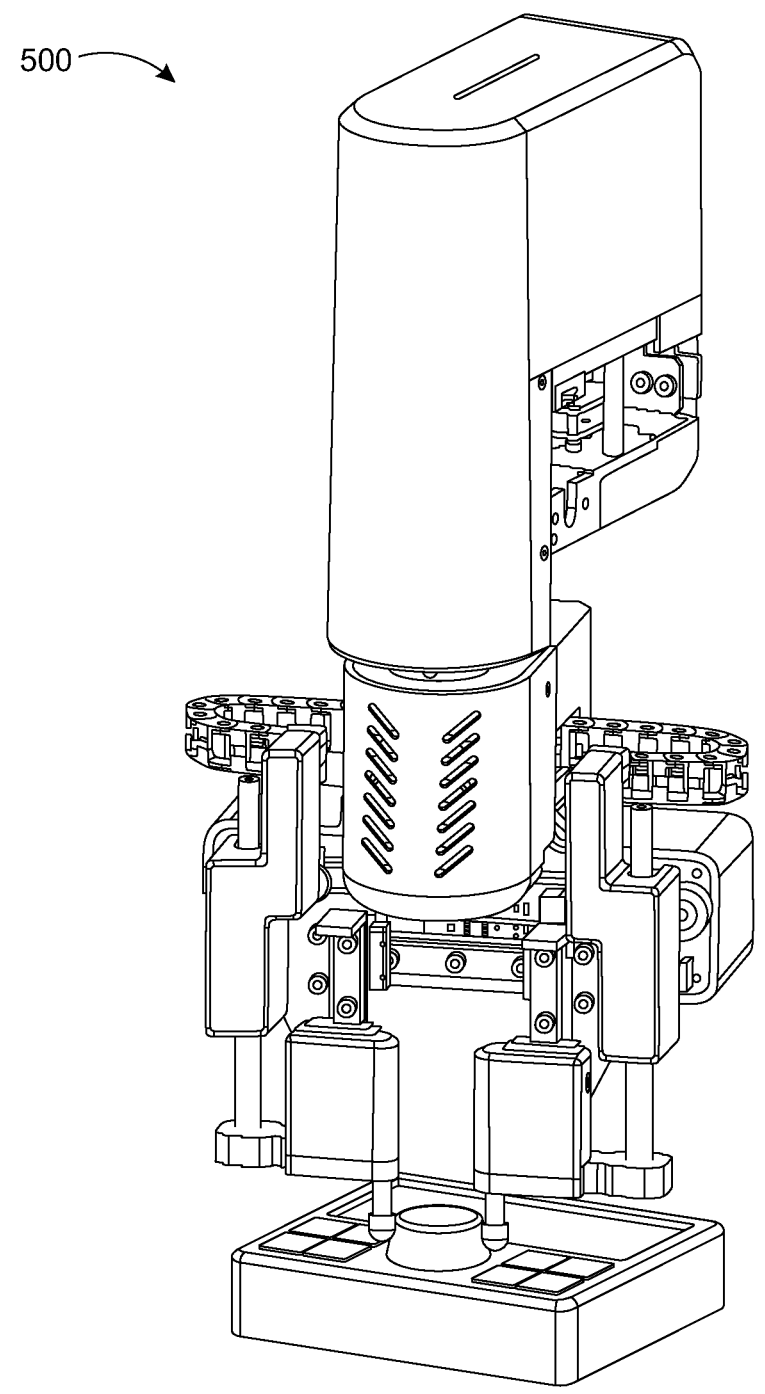
FIG. 5 illustrates a perspective view of the modular robotic multi-finger module operating rotating knobs in horizontal orientation, in accordance with one or more example embodiments.
Figure 6:
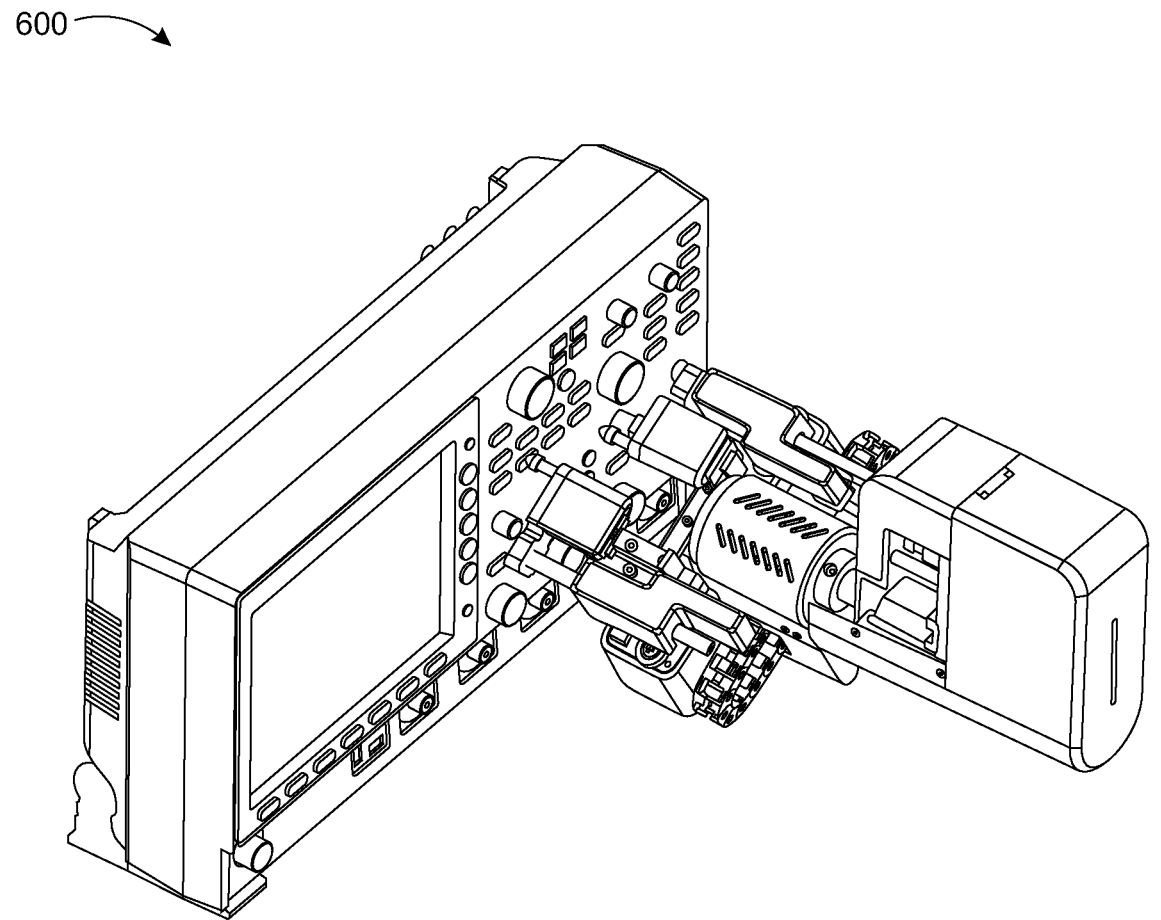
FIG. 6 illustrates a perspective view of the modular robotic multi-finger module operating hard buttons/keypads in a vertical orientation, in accordance with one or more example embodiments.
Figure 7:
FIG. 7 illustrates a perspective view of the modular robotic multi-finger module operating touch screens in vertical orientation, in accordance with one or more example embodiments.
Figure 7:
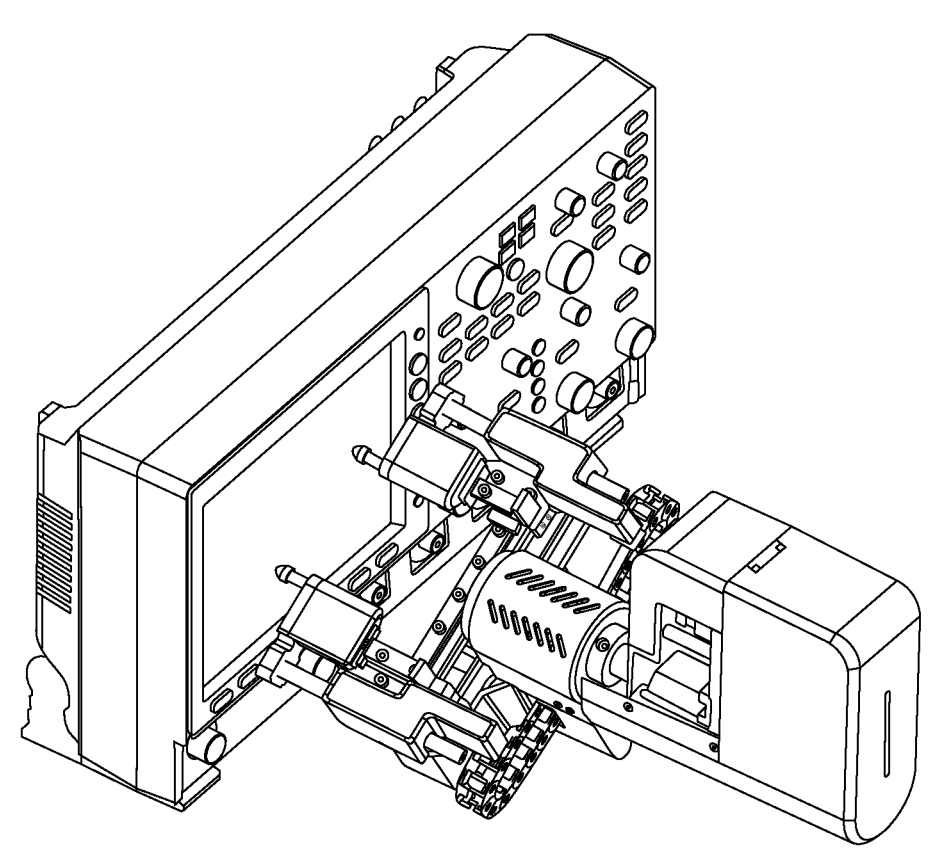
Figure 8:
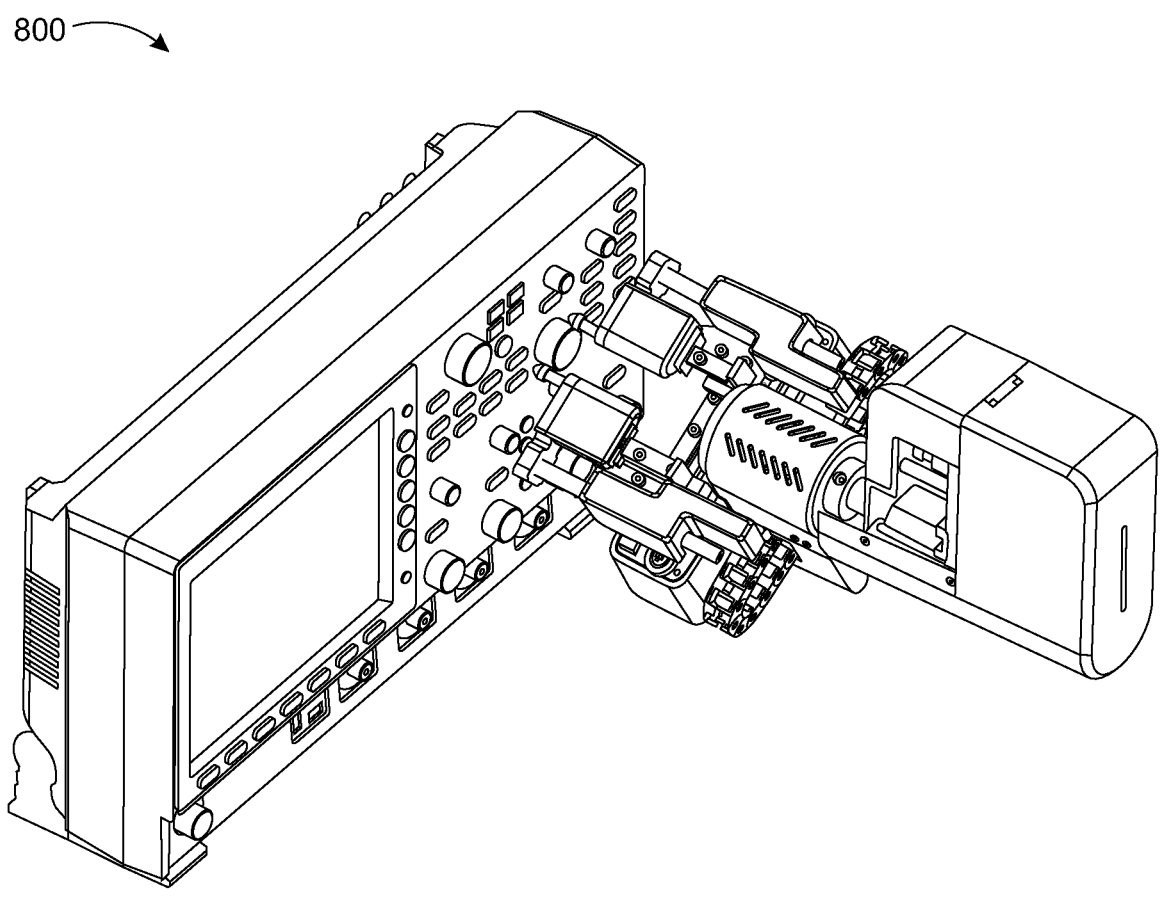
FIG. 8 illustrates a perspective view of the modular robotic multi-finger module operating rotating knobs in a vertical orientation, in accordance with one or more example embodiments.
Figure 9:
FIG. 9 illustrates a perspective view of the modular robotic multi-finger pinch and zoom module that can fit into any SCARA or Articulated robotic arm, in accordance with one or more example embodiments.
Figure 9:
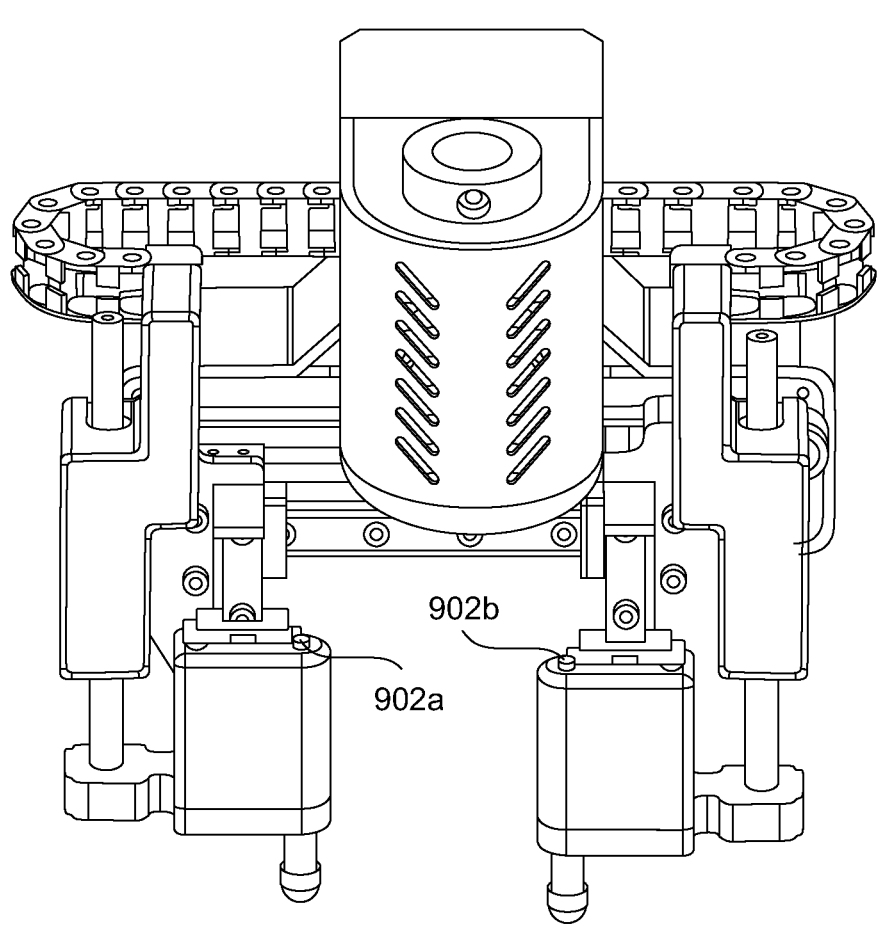
Figure 10:
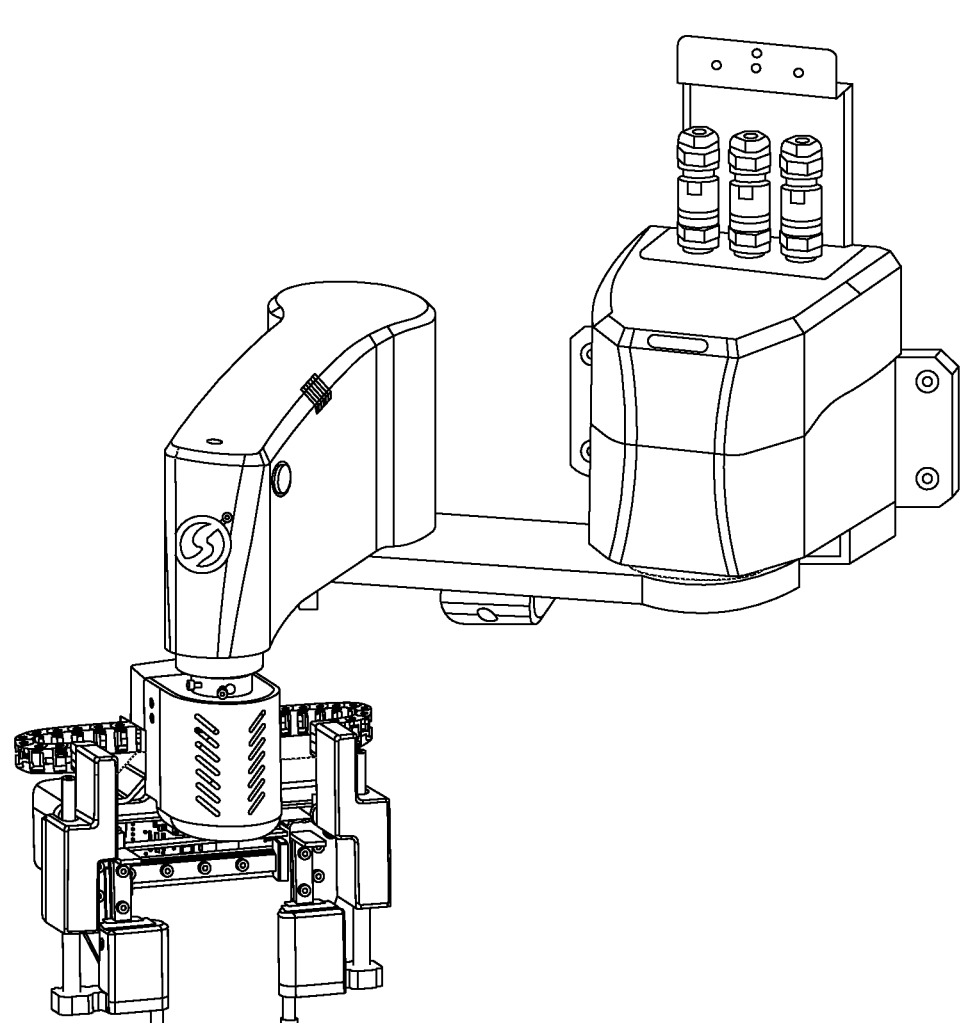
FIG. 10 illustrates a perspective view of the modular robotic multi-finger pinch and zoom module integrated into a SCARA robotic arm, in accordance with one or more example embodiments.
Figure 11:
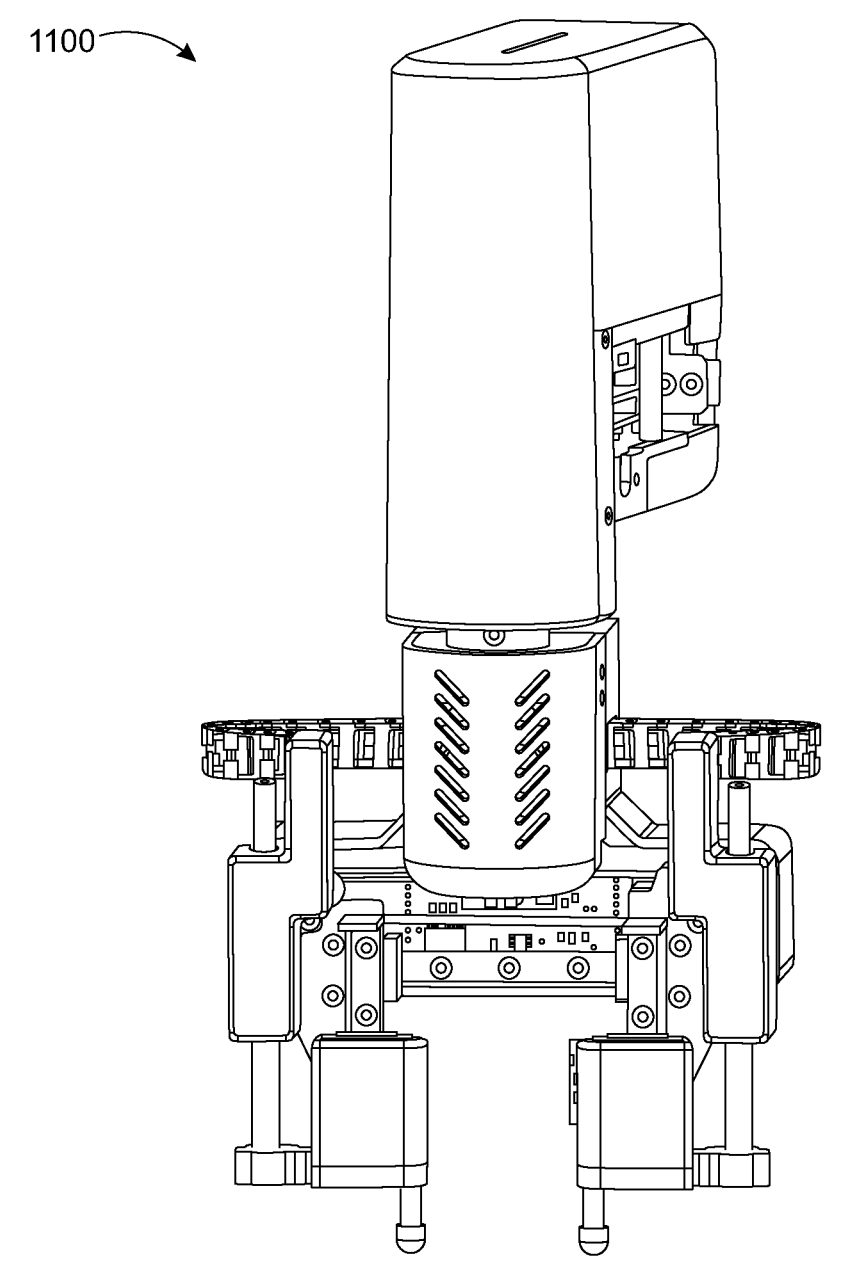
FIG. 11 illustrates a perspective view of the modular robotic multi-finger pinch & zoom module along with the rotational axis that can fit into any cartesian robotic arm, in accordance with one or more example embodiments.
Figure 12:
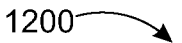
FIG. 12 illustrates a perspective view of the modular robotic multi-finger pinch & zoom module along with the rotational axis integrated into a vertically operated cartesian robotic arm, in accordance with one or more example embodiments.
Figure 12:
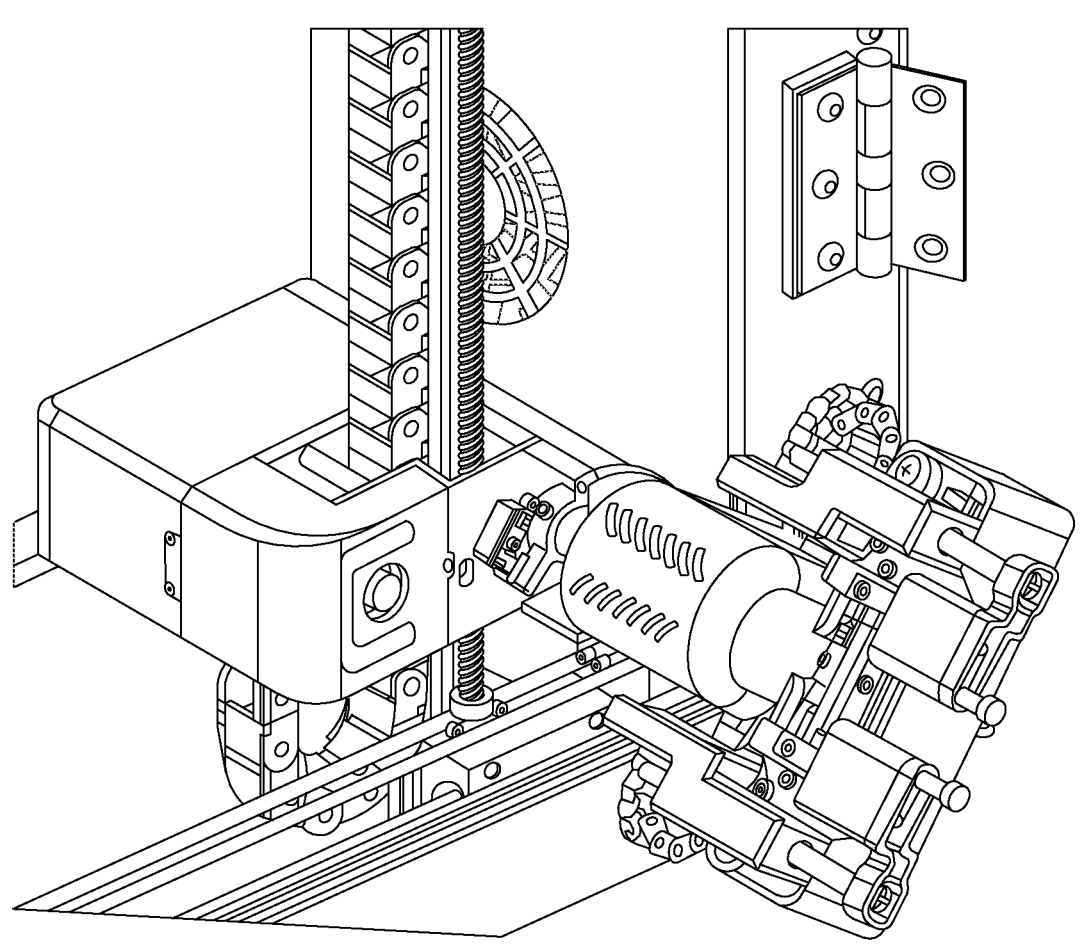
Figure 13:
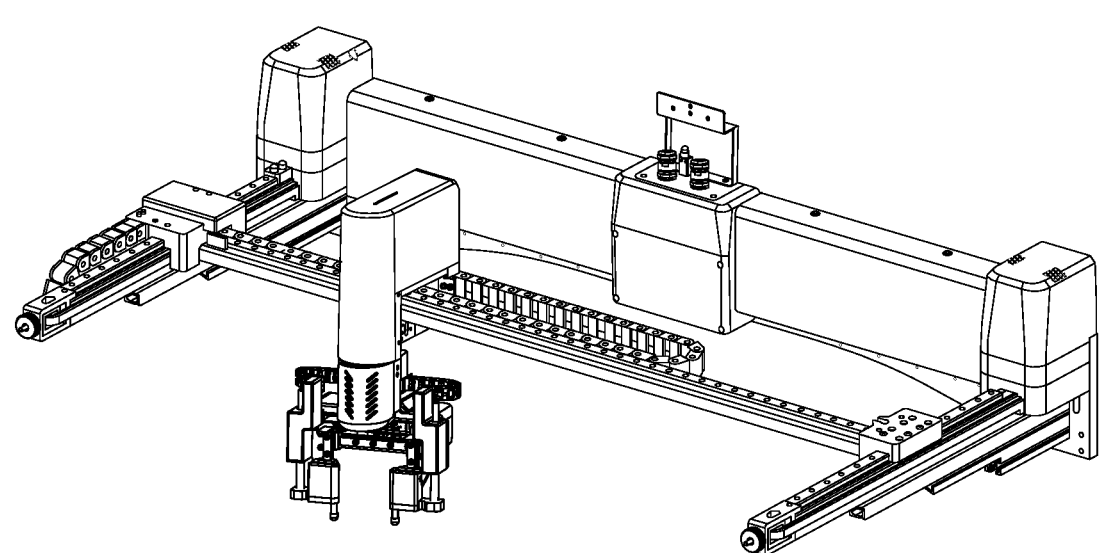
FIG. 13 illustrates a perspective view of the modular robotic multi-finger pinch & zoom module along with the rotational axis integrated into a horizontally operated cartesian robotic arm, in accordance with one or more example embodiments.
Figure 14:
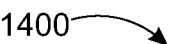
FIG. 14 illustrates a perspective view of the cartesian robotic arm with an active two-finger module along with a set of test devices, in accordance with one or more example embodiments.
Figure 14:
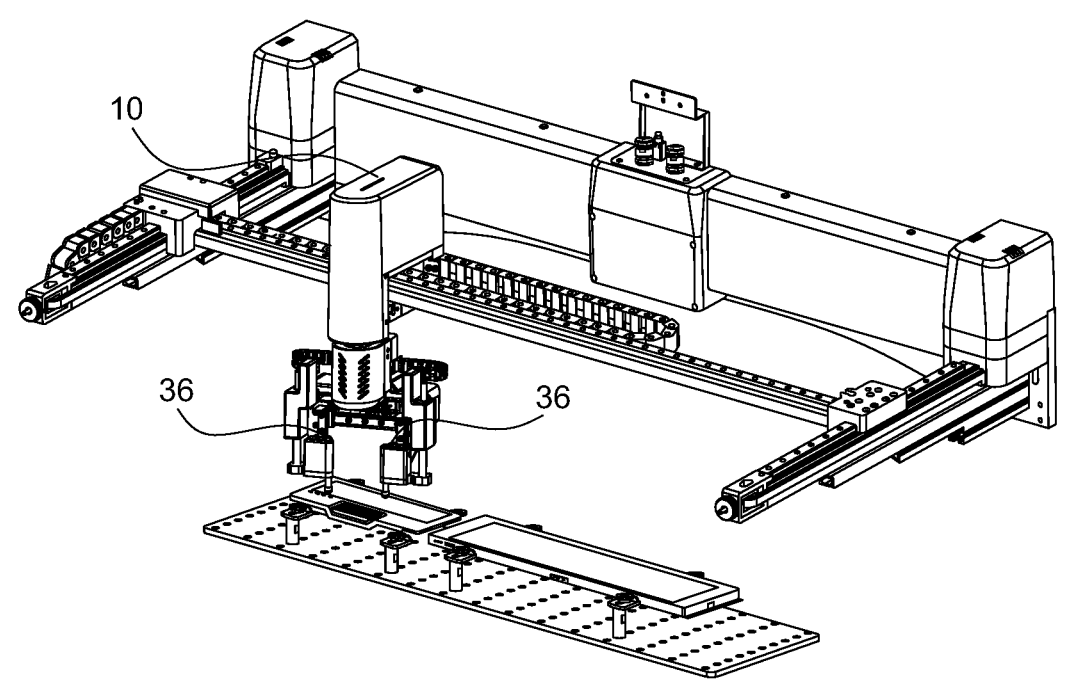
Figure 15:
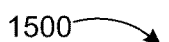
FIG. 15 illustrates a perspective view of the complete test rig based on a cartesian robot with integrated multi-fingers for verification and validation of smart connected Human-Machine Interface (HMI) devices, in accordance with one or more example embodiments.
Figure 15:
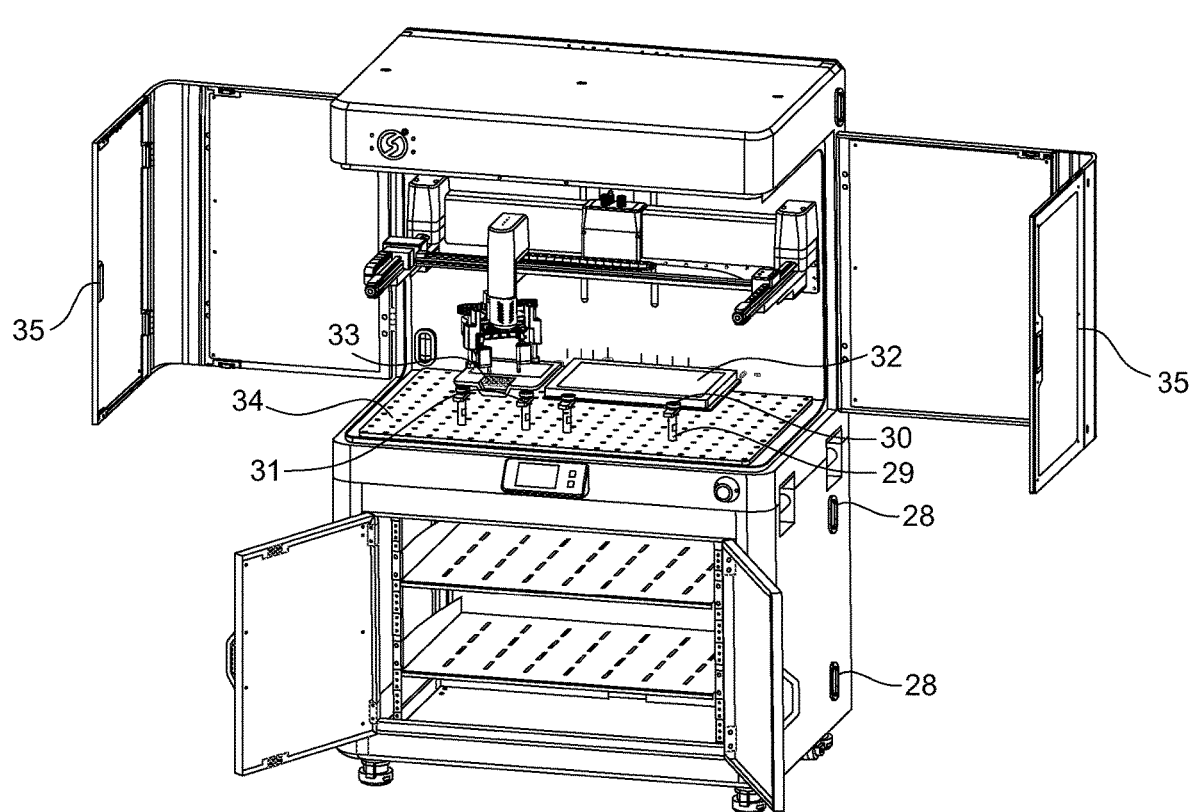
Figure 16:
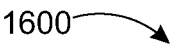
FIG. 16 illustrates a perspective view of the SCARA robotic arm with an active two-finger module along with a set of test devices, in accordance with one or more example embodiments.
Figure 16:
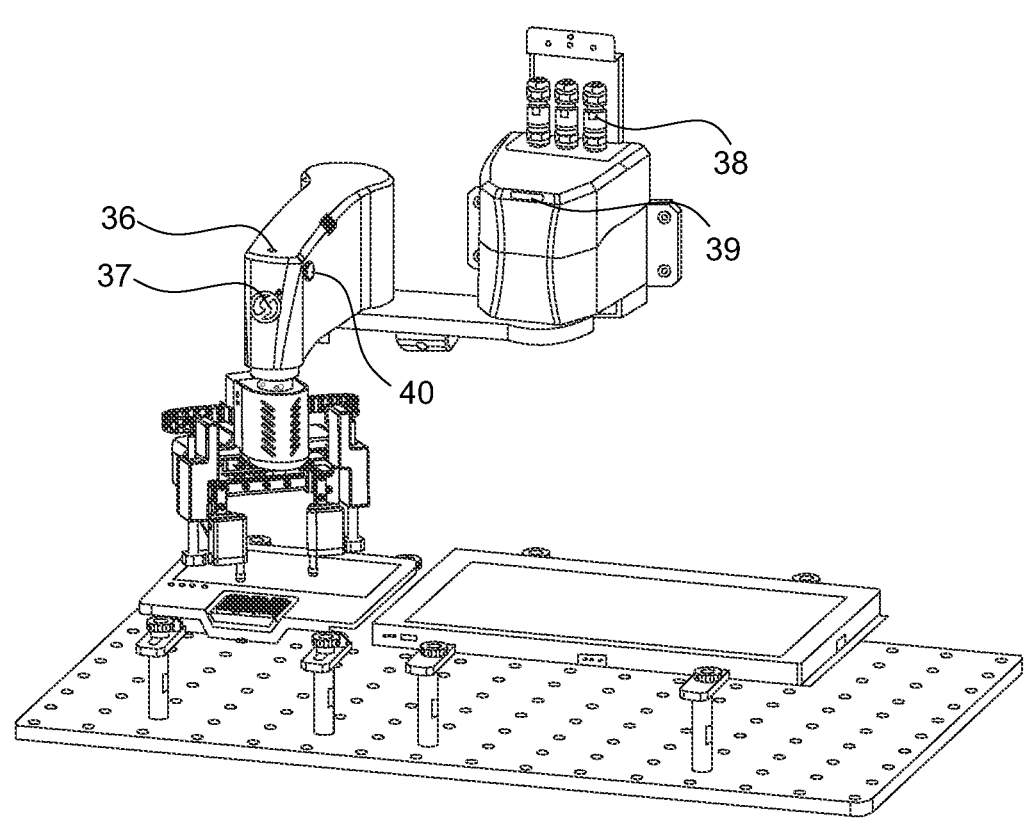
Figure 17:
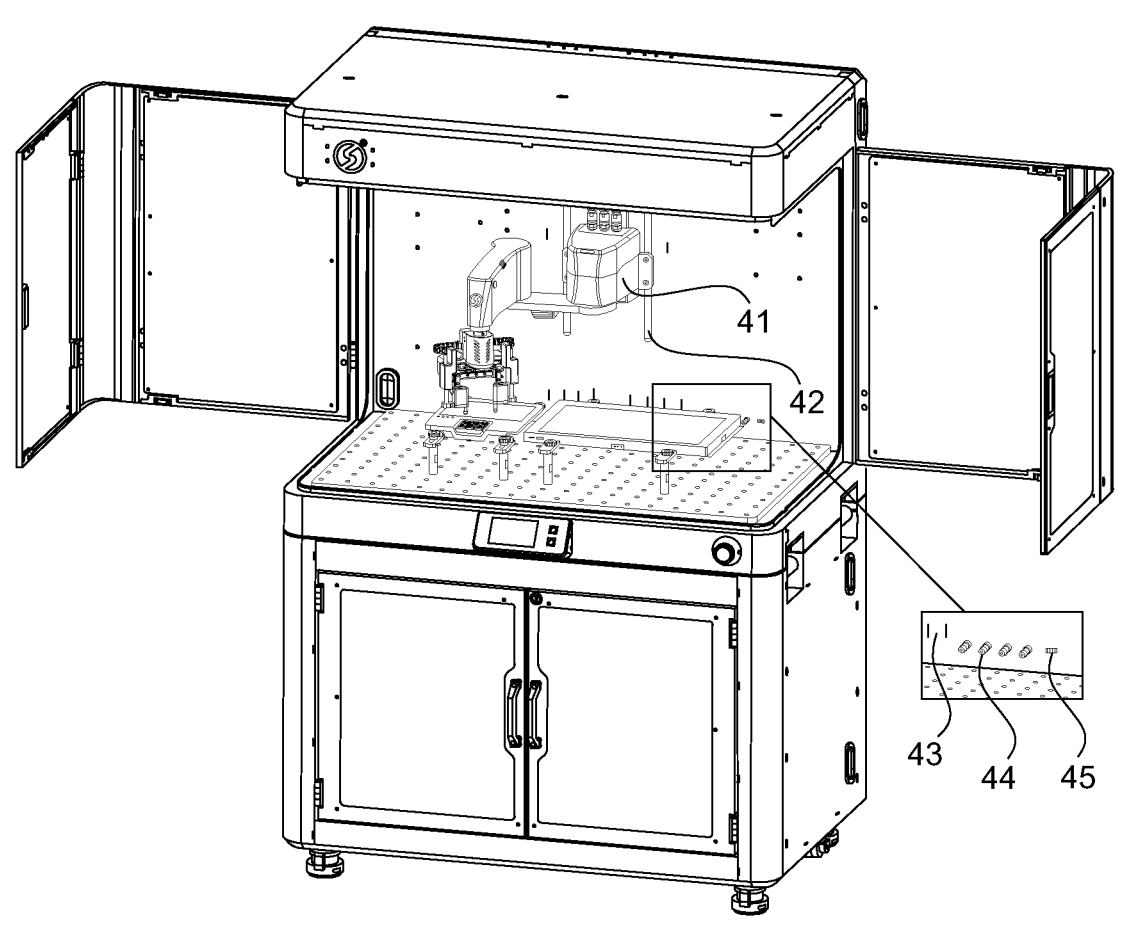
FIG. 17 illustrates a perspective view of the complete test rig based on a SCARA robot with integrated multi-fingers for verification and validation of smart connected Human-Machine Interface (HMI) devices, in accordance with one or more example embodiments.
Figure 18:
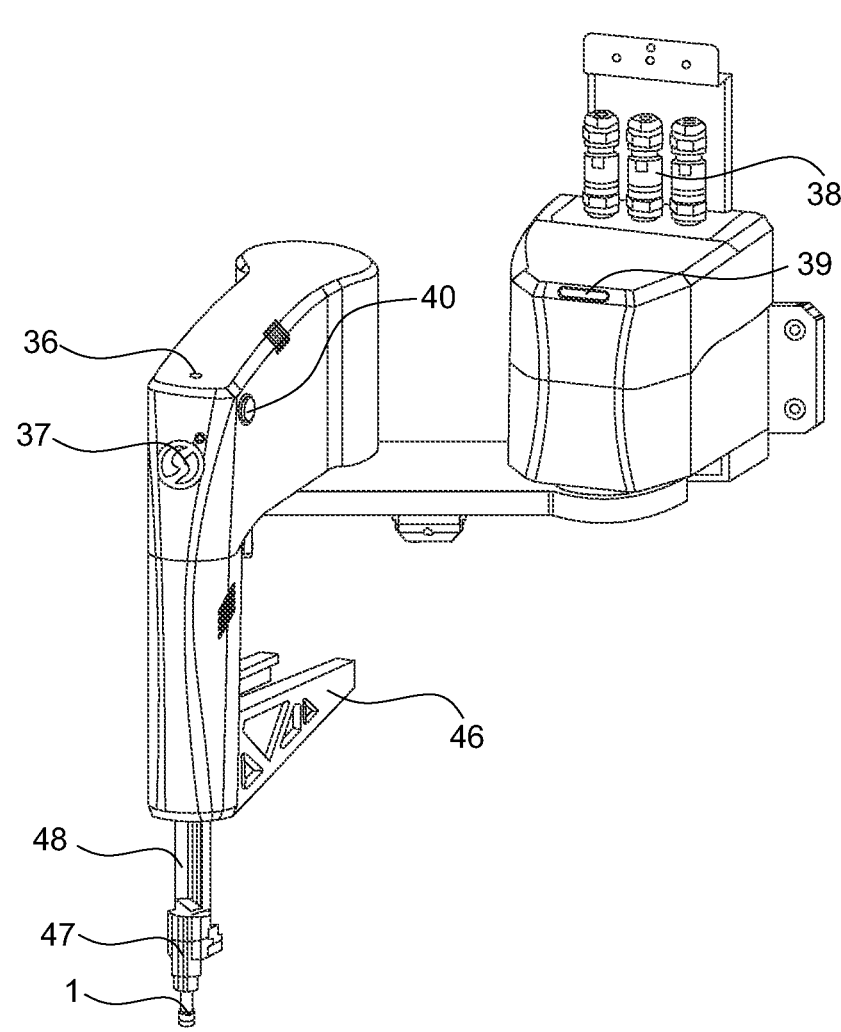
FIG. 18 illustrates a perspective view of the SCARA robotic arm with an active single-finger module, in accordance with one or more example embodiments.
Figure 19:
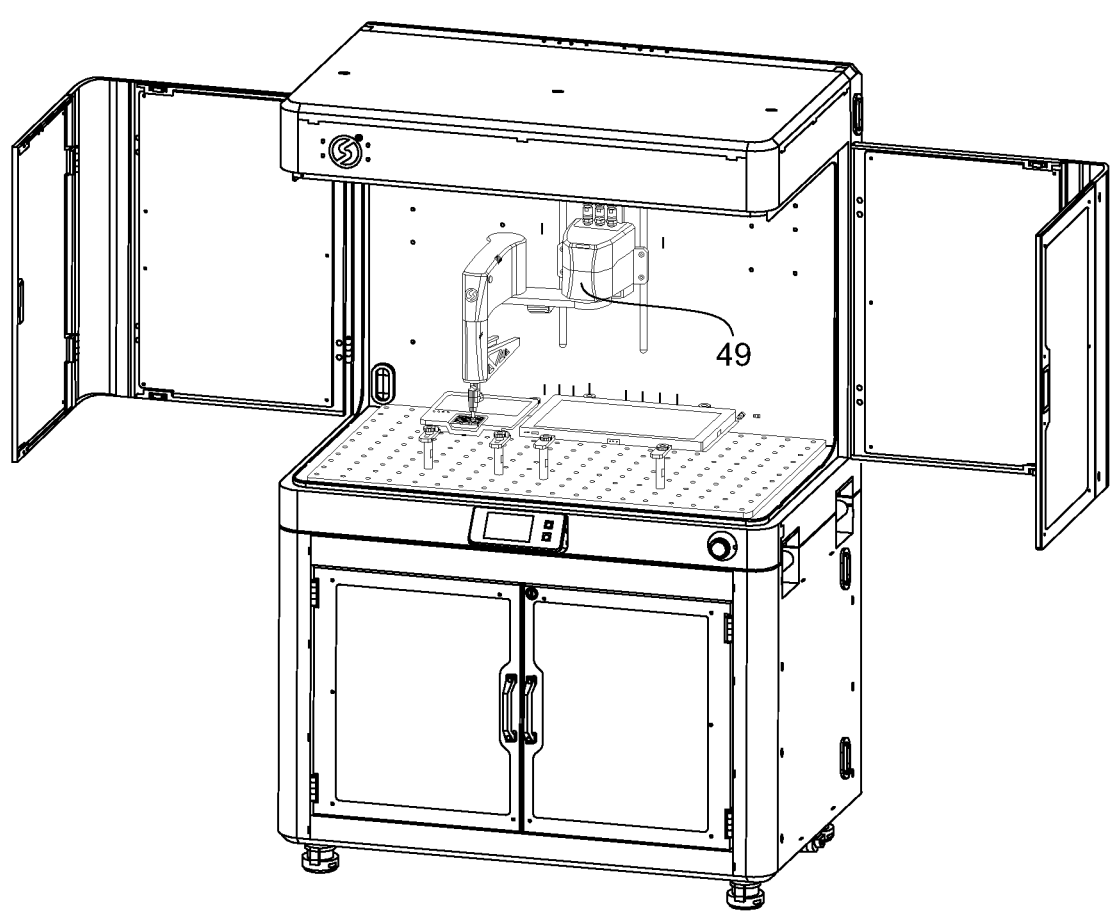
FIG. 19 illustrates a perspective view of the complete test rig based on a SCARA robot with an integrated single finger for verification and validation of smart connected Human-Machine Interface (HMI) devices, in accordance with one or more example embodiments.
Figure 20:
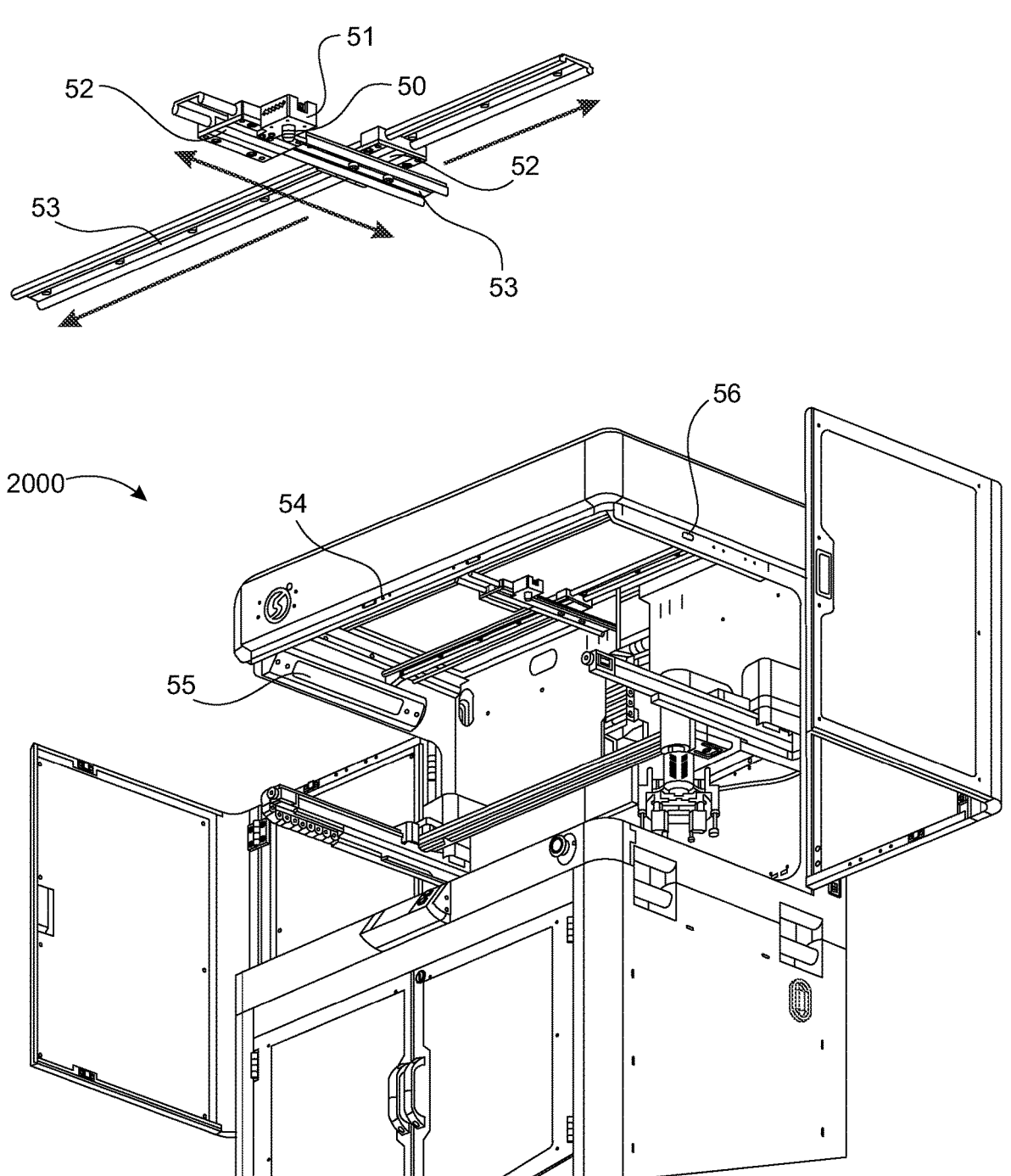
FIG. 20 illustrates a perspective view of the adjustable global vision camera module with luminance control, in accordance with one or more example embodiments.

FIG. 2 illustrates a perspective view 200 of the complete test bench setup for verification and validation of smart connected Human-Machine Interface (HMI) devices, in accordance with one or more example embodiments. FIG. 3 illustrates a perspective view 300 of the modular robotic multi-finger module operating hard buttons/keypads in horizontal orientation, in accordance with one or more example embodiments. FIG. 4 illustrates a perspective view 400 of the modular robotic multi-finger module operating touch screens in horizontal orientation, in accordance with one or more example embodiments. FIG. 5 illustrates a perspective view 500 of the modular robotic multi-finger module operating rotating knobs in horizontal orientation, in accordance with one or more example embodiments. FIG. 6 illustrates a perspective view 600 of the modular robotic multi-finger module operating hard buttons/keypads in a vertical orientation, in accordance with one or more example embodiments. FIG. 7 illustrates a perspective view 700 of the modular robotic multi-finger module operating touch screens in a vertical orientation, in accordance with one or more example embodiments. FIG. 8 illustrates a perspective view 800 of the modular robotic multi-finger module operating rotating knobs in a vertical orientation, in accordance with one or more example embodiments. FIG. 9 illustrates a perspective view 900 of the modular robotic multi-finger pinch and zoom module that can fit into any SCARA or Articulated robotic arm, in accordance with one or more example embodiments. In FIG. 9, there is a depiction of touch indicators 902a and 902b. In one embodiment, the touch indicators 902a and 902b is an LED electrically connected to the finger module. The touch indicators 902a and 902b serve as a visual cue for both the global vision camera system and the user. When the stylus initiates a valid touch at the instructed force, the color of the touch indicators 902a and 902b changes. This alteration in color can be detected by the vision system, enabling it to calculate various parameters of the Device Under Test (DUT), such as latency, frame skipping, and performance metrics. This mechanism not only facilitates the detection of valid touches by the vision system but also enhances the overall assessment process. FIG. 10 illustrates a perspective view 1000 of the modular robotic multi-finger pinch and zoom module integrated into a SCARA robotic arm, in accordance with one or more example embodiments. FIG. 11 illustrates a perspective view 1100 of the modular robotic multi-finger pinch & zoom module along with the rotational axis that can fit into any cartesian robotic arm, in accordance with one or more example embodiments. FIG. 12 illustrates a perspective view 1200 of the modular robotic multi-finger pinch and zoom module along with the rotational axis integrated into a vertically operated cartesian robotic arm, in accordance with one or more example embodiments. FIG. 13 illustrates a perspective view 1300 of the modular robotic multi-finger pinch & zoom module along with the rotational axis integrated into a horizontally operated cartesian robotic arm, in accordance with one or more example embodiments. FIG. 14 illustrates a perspective view 1400 of the cartesian robotic arm with an active two-finger module along with a set of test devices, in accordance with one or more example embodiments. FIG. 15 illustrates a perspective view 1500 of the complete test rig based on a cartesian robot with integrated multi-fingers for verification and validation of smart connected Human-Machine Interface (HMI) devices, in accordance with one or more example embodiments. FIG. 16 illustrates a perspective view 1600 of the SCARA robotic arm with an active two-finger module along with a set of test devices, in accordance with one or more example embodiments. FIG. 17 illustrates a perspective view 1700 of the complete test rig based on a SCARA robot with integrated multi-fingers for verification and validation of smart connected Human-Machine Interface (HMI) devices, in accordance with one or more example embodiments. FIG. 18 illustrates a perspective view 1800 of the SCARA robotic arm with an active single-finger module, in accordance with one or more example embodiments. FIG. 19 illustrates a perspective view 1900 of the complete test rig based on a SCARA robot with an integrated single finger for verification and validation of smart connected Human-Machine Interface (HMI) devices, in accordance with one or more example embodiments. FIG. 20 illustrates a perspective view 2000 of the adjustable global vision camera module with luminance control, in accordance with one or more example embodiments.

Figure 21:
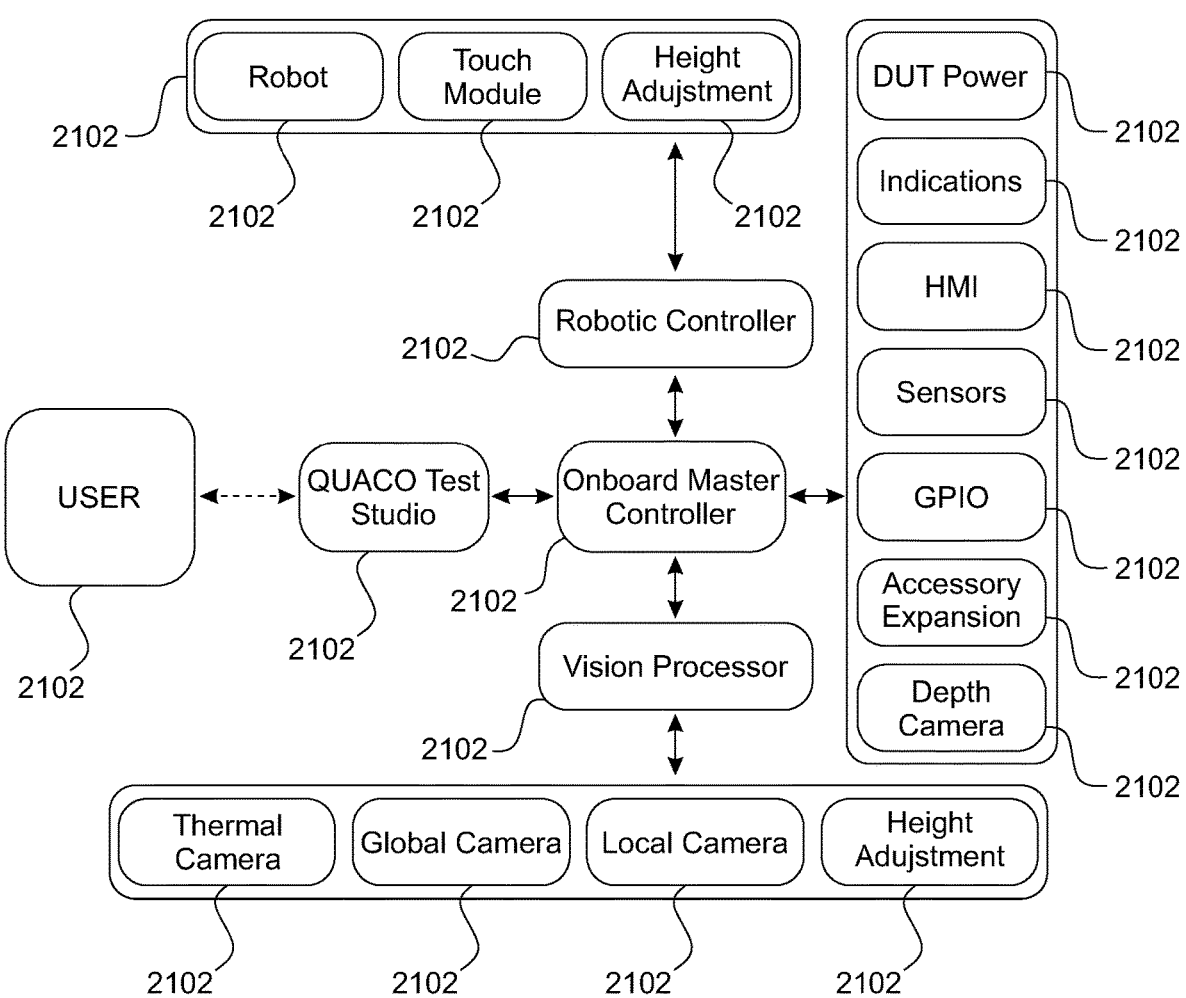
FIG. 21 illustrates a block diagram of the robotic system showing the position of the global vision module position and API controllable rig light, in accordance with one or more example embodiments.

FIG. 21 illustrates a block diagram of the robotic system 2100 showing the position of the global vision module position and API controllable rig light, in accordance with one or more example embodiments. FIG. 21 is explained in conjunction with FIGS. 1-20. Briefly, the robotic system 2100 includes a robotic module 2102 that further includes a robot 2104, a touch module 2106, and a height adjustment mechanism 2108, wherein the robotic module 2102 is further connected to a robotic controller 2110, an onboard master controller 2112, a vision processor 2114, and a QUACO test studio 2116. In an embodiment, the QUACO test studio 2116 is operated by a user 2118. In an embodiment, the onboard master controller 2112 is connected to a processing module 2120, and a camera module 2122. The processing module 2120 includes a DUT power 2124, a plurality of indication units 2126, an HMI 2128, a plurality of sensors 2130, a GPIO 2132, and an accessory expansion 2134. In an embodiment, the camera module 2122 includes a thermal camera 2136, a global camera 2138, a local camera 2140, and a depth camera 2142.

The present disclosure further describes the detailed explanation of each of the components of the robotic system 100 in conjunction with FIGS. 1-22. The robotic system 100 includes a smart stylus/replaceable fingertip 1; a force/haptic module 2; a finger actuator 3; a finger module cable chain 4; a homing module 5; a universal mounting guides 6; a smart vision lights 7; a smart vision camera 8; a finger rotary module with integrated vision system 9; a smart status indication 10; a smart cartesian robotic arm 11; a smart HMI screen 12; a heavy duty rig table 13; a rack mounting rack plates 14; a multi-functional anti-vibrating caster wheels 15; an emergency stop 16; a test device barcode printer 17; a keyboard 18; a mouse 19; an external emergency stop module 20; a host PC with Quaco test studio 21; a power inlet module 22; an ethernet port 23; a USB port 24; an HDMI port 25; an external E-Stop connector 26; GPIO ports 27; cable IN/OUT ports 28; an universal DUT mounting bracket piller 29; an universal DUT mounting slider unit 30; an universal DUT mounting knobs 31; a DUT1 32; a DUT2 33; a DUT bed (CMM Plate/DUT mounting plate) 34; a L-door 35; a touch indicator LED 36; smart status indications 37; a manipulator connector 38; a robot status indicator 39; a teach switch 40; SCARA robot with two finger module 41; a robot height adjustment module 42; a voice assistant test simulator 43; an in-built DUT power supply 44; an accessory expansion port 45; a local camera mounting bracket for SCARA 46; a smart stylus/replaceable fingertip 47; a smart stylus safety shaft 48; a SCARA robot with single finger module 49; a global vision camera 50; a global vision camera housing 51; a vision camera position arrest for X-Y axis 52; a vision camera X-Y guides 53; a safety door switch 54; a rig light 55; and a magnetic latch for the wide-open doors 56.

In an embodiment, the smart stylus/replaceable fingertip 1 helps a user to replicate bare human fingers, human fingers with gloves, water/sweat, impurities, etc. using different types of finger modules. It can be automatically or manually replaced. It also has and has the additional capability to perform precise pipetting and dispensing of liquid over any surface. The same stylus can be used for multiple kinds of Human Machine Interfaces (HMI) like touch screens, membrane switches, hard buttons, rocker switches, etc.

The force/haptic module 2 enables the robotic system 100 to simulate the human finger over the DUT by applying the precise force required for the given period and checking the performance of the system based on that touch. Each touch can be characterized and analyzed based on the feedback received. This smart stylus can record the haptic response from the HMI element while touching the surface. The same stylus module can measure parameters like the haptic feedback frequency, amplitude, duration, etc.

The finger actuator 3 is an ultra-high precision linear motors that provide high speed, accurate, and reliable finger movement throughout the life cycle which makes this system capable of running continuously for more than a year without any break.

The finger module cable chain 4 provides reliability in cable routing and prevents tangling and hanging cable occlusion for the vision camera. The homing module 5 provides positional accuracy and repeatability for the finger actions. The universal mounting guides 6 make it suitable for vertical and horizontal Cartesian robots mounting without any hardware changes or additions. The smart vision lights 7 is an API controllable light for the vision camera that helps to control the ambient light for better accuracy for the computer vision as well as controllability in the test chamber environmental light. The smart vision camera 8 is an integrated computer vision camera for vision-guided navigation and visual verifications. It will enable code-less automation using the software we have developed for the test automation platform. The finger rotary module 9 with an integrated vision system helps the system to rotate the finger module to a specific angle and aesthetically position the vision camera on a specific region for the maximum field of view coverage. The smart status indication 10 is a visual indicator using multi-colour light sources positioned on the top of the test rig. This indicates what is the current status of the system, like whether is it running properly or does it halt due to some error, safe to operate, etc. This is placed on the top of the rig so that it has good visibility from a long distance. This indication allows the user to get an easy assessment of the system status without the need for any other equipment. One buzzer is also a part of the smart indication system, it produces audio feedback based on different events. The smart cartesian robotic arm 11 is a uniquely designed cantilever-type cartesian lightweight robot that is compatible with multiple types of end effectors such as finger modules, pipetting modules, pick & place modules, vision inspection modules, or a combination of these capabilities. The unique mechanical design helps a user to conveniently operate beneath it without many obstructions. This helps to accommodate larger DUTs into the system. The smart HMI screen 12 is a smart onboard user interface that enables easy monitoring and adjustment of various settings on the test rig. This HMI consists of a touch screen with push button switches to navigate to different menu items in the screen as well as help a user to customize the settings as required. This also contains DUT persona memory, which remembers the DUT's properties and settings required. The robot will load these settings automatically when the same test device is placed again under the robot.

The heavy-duty rig table 13 is a highly customizable rig table to provides: a. solid mounting provisions for the robot rig; b. conveniently arrange and cable additional test support equipment such as API controllable power supply, signal generators, analyzers, etc. c. multi-fictionality anti-vibrating caster wheel with manual thumb wheel nut open-ended wrench for leveling adjustment and on-premises test system movements; d. inbuilt power distribution unit supports any standard power socket along with electrical isolator unit; e. wide open front and back door for flexibility of device mounting, organizing, and cable routing; f. customizable cabling racks and grommets; g. adjustable rack-mountable equipment mounting rail.

The rack mounting rack plate 14 provides convenient positioning of test support devices such as API controllable power supply, accessory expansion units, signal generators, signal analyzers, etc.

The multi-functional anti-vibrating caster wheels 15 provide solid placement of the test device, and its manual thumb wheel nut open-ended wrench helps to level adjustment. A user can simply move this heavy device without much effort inside a test lab or production place.

The emergency stop 16 is a manual override stop switch to halt the entire system manually if any unforeseen issues happen to the DUT of the equipment. When this is pressed immediately the power is disconnected from the system to make the system inactive.

The test device barcode printer 17 helps a user create a unique barcode/QR code for each test device while creating the device library using the software suite. It will help the robot verify each device after test device replacement and prevent hardware damage.

The keyboard 18 is used for interacting with RAF (robot automation framework) and the test suite.

The mouse 19 helps a user to train the robot using simple UI software as part of the Robot Automation Framework (RAF) and our test suite. It will also help a user to program the robot with simple mouse clicks though the vision camera feed while coding the robot (code-less automation).

The external emergency stop module 20 is an option for an additional emergency switch to the system with the same functionality as 16. If the equipment is far away from the user's worktable an additional emergency switch 20 can be connected to the system, which can be put on the work table near the user. This also has the same functionality to manually cut the system power to the motors which immediately halt the entire system in case of any issues or unforeseen happen during the operation.

The host PC with Quaco Test Studio 21 is a locally connected host PC that runs the host software of the equipment through which we can create, execute, and analyze test cases. This host system can be local, or a remote system connected through the same networks of QUACO.

In the absence of a host PC, the test suite software can be hosted either in the cloud or within the QUACO onboard computing system. Accessing it is possible via an external laptop or by connecting a computer screen through the diverse external ports available in QUACO.

The power inlet module 22 is a port that is for sourcing the power to the system, it is also equipped with a fuse to ensure the test platform's safety from electrical fluctuations.

The ethernet port 23 is configured to talk to the external world through this port. An Ethernet cable can be connected to a network or a host computer directly and can be connected using IP-based connectivity. The USB port 24 allows the user to connect their laptop or PC to the robotic platform and access the controls through this port. The HDMI port 25 allows the user to connect the local monitor and use the QUACO test studio/test suite using this port. The external E-stop connector 26 is an option for an additional emergency switch to the system with the same functionality as 16. If the equipment is far away from the user worktable an additional emergency switch 20 can be connected to the system, which can be put on the worktable near the user. This also has the same functionality to manually cut the system power to the motors which immediately halt the entire system in case of any issues or unforeseen happen during the operation. The GPIO ports 27 The method wherein testing of device functionality is validated using a feedback control loop for which data is obtained from the device under test using configurable GPIOs in the simulation apparatus. This method of feedback control loop may be utilized for independent verification and validation of the system and take corrective actions during a verification and validation process. This also provides a fast and reliable feedback loop with which a high-speed sensing of some condition can be achieved such as latency measurement, and for which the latency induced by the simulating apparatus will be constant all the time. The cable IN/OUT ports 28 is configured to pass electrical cabling, pneumatic lines, etc. which are either needed by the DUT or the robotic system and can be passed through this safely and in an organized manner. These ports are covered with soft material through which the cables are routed to avoid any damage to the cable for prolonged uses. The universal DUT mounting bracket pillar 29 is a customizable test device mounting pillar to firmly install/mount the test device on the CMM plate (test device mounting plate). The universal DUT mounting slider unit 30 is a customizable test device mounting part to firmly install/mount the test device on the mounting bracket Piller. It also helps to adjust the x-y position of the test device. The universal DUT mounting knobs 31 help a user to firmly install/mount the test device on the mounting bracket pillar. The DUT1 32 is a 17-inch touchscreen-based test device.

In an embodiment, the DUT2 33 is a test device having touch screens and hard buttons. The DUT bed (CMM Plate/DUT mounting plate) 34 is a platform that is used to mount the test device to the system, this is ESD safe & has standard mounting holes at an equal distance matrix pattern. To implement the method of functional testing with repeatability and accuracy the equipment consists of pluralities of mechanisms and fixtures to enable fastening of the device under test of any given size, in appropriate orientations such that it enables the simulation apparatus to actuate various DUT interfaces. These fixtures have multiple features other than the mounting of the DUT, such as side switch actuation, tilt or rotation of the DUT, etc.

The L-door 35 is a uniquely designed L-shaped lightweight door that provides wide openings to the robot system providing better operating access to a user to mount test devices as well as accommodate extra-large test devices. This door design also helps to install this robotic platform in both R&D and production environments. In case of production line usage, a conveyor can be routed through this system.

The touch indicator LED 36 is a visual indication for the global vision camera system or the user. Once the stylus does a valid touch at the commanded force, the color of this indication will change, this color change can be picked up by the vision system and can be used to calculate different parameters of the DUT like latency, frame skipping, performance parameters, etc. This also ensures that a valid touch is done using the vision system.

The smart status indications 37 are visual indicators using multi-color light sources on the robot which provides the user an indication about what is the current status of the system, like whether is it running properly or does it halt due to some error, safe to operate, etc. This is placed on the robot so that it has good visibility for the user. This indication allows the user to get an easy assessment of the system status without the need for any other equipment. One buzzer is also a part of the smart indication system, it produces different frequency sounds based on different events.

The manipulator connector 38 is connected using to connect the robotic manipulator to the test rig. When the manipulator needs to be changed by replacing it with another type of manipulator for a specific application, this connector can be removed and reconnected to the new manipulator by a user within a few minutes.

The robot status indicator 39 is a visual indicator with similar functionality to 37.

The teach switch 40 is used to teach the robotic system each step of the testing process just by moving the robotic arm with bare hands and clicking the one-touch teach buttons. The robot records each action executed using the button click and after teaching all the steps, the robot can run those test standalone. This gives a very easy and effective way to do the robot training. Also, these button clicks will automatically generate API/test scripts in the connected software suite, the user can easily copy and paste these script lines to their test automation framework which will reduce manual typing errors & efforts.

The SCARA robot with two-finger module 41 is a modular SCARA (Selective Compliance Assembly Robot Arm) particularly designed for HMI testing automation which can accommodate multiple types of end effectors such as single finger touch module, multi-finger touch module, pick & place module, pipetting module, etc.

The robot height adjustment module 42 is used to adjust the operating height of the robots with respect to the DUT bed which will help to mount various types of DUTs to the test rig. The height adjustment can be done by the human-machine interface in the robot rig or through an API interaction from the software suite.

The voice assistant test simulator 43 helps the user to simulate human kind of voice feedback for voice assistance testing as well as capture voice responses from the test device.

The in-built DUT power supply 44 is an internal power supply for the DUTs (test device). In the case of In-Vehicle Infotainment and portable devices, this internal power supply can be used to power. This internal DUT power supply is controllable through commands so that to do the test related to power cycling, it can precisely monitor the power source to the DUTs to analyze the performance of the system. There is a switch near the DUT power outlet console or the HMI, which can be used to switch the power manually. There are options to integrate external high-precision power supplies to these DUT power channels and control through APIs.

With respect to the accessory expansion port 45, during the verification and validation process of any DUTs, there may be specialized mechanical movements/electrical actuations needed to be given to specific DUTs. This includes actuating an interface element that is away from the end-effector and feeding any type of verification signal into the DUT like Bluetooth, radio modules, signal simulators, etc.

For all these needs there can be a common or separate interface within the apparatus with which a user can attach such special modules and users can easily add up features without any alteration to the existing apparatus. This modular nature of accessories makes it simple, easy, and at the same time more realistic. These accessories may also be customized for any particular DUT or test scenario.

The local camera mounting bracket 46 for SCARA helps to mount an additional vision camera to closely monitor the changes happening in the test device. This helps to capture and analyze minute changes in the screen based on the actions executed by the robot.

The smart stylus/replaceable fingertip 47 helps a user to replicate bare human fingers, human fingers with gloves, water/sweat, and impurities using different types of finger modules. It can be automatically or manually replaced. It also has the additional capability to perform precise pipetting and dispensing of liquid over any surface. The same stylus can be used for multiple kinds of Human Machine interfaces (HMI) like touch screens, membrane switches, hard buttons, rocker switches, etc. This module will allow the system to simulate the human finger over the DUT by applying the exact force required for a given period and checking the performance of the system based on that touch. Each touch can be characterized and analyzed based on the feedback received. This smart stylus can record the haptic response from the HMI element while touching. The system can measure parameters like the haptic feedback frequency, amplitude, duration, etc. with the same stylus module.

The smart stylus safety shaft 48 is a breakable part that helps to mount the smart finger module which is a sensitive element to the test device. This acts as a weak point for the stylus thereby helping not to damage the DUT in case of any severe collision due to error. If any SOP violation or API mishandling happens it will ensure the safety of the finger module without damaging the smart stylus sensor module.

The SCARA robot with single finger module 49 is a modular SCARA (Selective Compliance Assembly Robot Arm) particularly designed for HMI testing automation which can accommodate multiple types of end effectors such as single finger touch module, multi-finger touch module, pick & place module, pipetting module, etc.

The global Vision Camera 50 helps the vision system monitor the activities from a global position. It also provides a wide perspective view along with a mouse click-based navigation across the robot's active workspace. The global vision camera housing 51 protects the vision cameral models and offers customizable fixtures to different camera models which can be retrofitted into the system. The vision camera position arrest for X-Y axis 52 helps the user to mechanically lock the camera position on a desired location favorable to the vision system.

The vision camera X-Y guides 53 provides a lubrication-free slider rail for adjusting the vision camera over the work area. The safety door switch 54 provides a safety alert in case of any SOP (standard operating procedure) violation happening during the operating time. The logs will be captured and showcased in the inbuilt UI interface of the robot platform. The Right Light 55 is an API controllable rig light with luminance adjustment that helps to create an ideal lighting environment for the vision system. The robotic system will capture this specific lighting condition for each UI element of the test device during the training time. The magnetic latch 56 for the wide-open doors helps to close the door firmly and avoid external light entering the rig cabin.

According to an embodiment herein, the robotic system 100 is an apparatus used for performing various types of verification and validation including endurance, performance, stability, etc. for both R&D and production environments over a wide variety of devices under test. This apparatus can simulate well-defined usage scenarios of devices with actions including touch, swipe, hover, and other hand gestures. Also, the equipment is equipped to simulate various other human input actions like hand movement, walking, temperature change, gripping, glove mode, drop test, liquid spill test, vibrations, speech, etc.

The apparatus has feature simulations specific to the Device Under Test (DUT) which uses Bluetooth, Wi-Fi, network emulators, DUT-specific sensor inputs, and any other inputs to the device. This DUT-specific feature simulation is controlled by this apparatus itself using its accessory expansion interface. The provision for mounting the DUT can be done in two different ways, the apparatus can be mounted over the DUT in any orientation based on the requirement of the DUT and also the DUT can be mounted under the verification and validation apparatus to a prefabricated intelligent DUT holder with several functionalities to perform the verification and validation. The apparatus is also capable of precisely measuring every parameter of its input to the DUT and also sensing and logging all the response parameters from the DUT and capable of planning the test cases based on the response by itself. The system may consist of a multi-dimensional actuator system to perform the intended action over the DUT.

The apparatus is capable of close looping a test case by taking images, videos, or taking various signal feedback from the sensor modules within the device under test (DUT) and is also capable of receiving outputs from the DUT and reconfiguring the test case based on that. The entire control system of the apparatus resides within the system and can be controlled using a user interface within the apparatus or by remote control panel through any internet-connected device or by locally connected device using any data communication technologies. The apparatus is also capable of connecting to a networking device and creating a farm of verification and validation apparatus setup with a remote or cloud-hosted control panel.

According to an embodiment herein, the robotic system 100 provides a height adjustment. The apparatus may have the capability of adjusting its distance between the DUT and the end effector based on the DUT's thickness. A linear movement mechanism based on belt drive or lead screw or rack and pinion or combination of any of these which will be attached to the manipulator arm (positioning controller) (Positioning Module) can change the distance based on a command from the control system either by manually input value or by intelligently sensing the DUT dimensional parameters. When a user presses and holds the height adjustment button the apparatus automatically senses the surface and automatically stops at a point that allows a smooth operation.

The apparatus can also memorize each DUT being used with it and remember its parameters the next time the same DUT is introduced for verification and validation under the apparatus. The mechanism for adjusting this distance will be having a homing mechanism to ensure its repeatability at all times. This distance adjustment mechanism may have a braking system to ensure more accuracy and repeatability during its operation. The attachment plate to the manipulator is a generic design so that any kind of manipulator can be attached to the apparatus in a common method and hardware.

The apparatus has connectivity to the user control terminal either located locally or in a remote location through software infrastructure. It may have the option to get connected through various types of interfaces, for example, USB, Ethernet, CAN, parallel, etc. It may also have the capacity to connect multiple apparatus and work synchronously with the help of a software infrastructure. The apparatus can receive commands from the user and send responses along with the results to the user. Once the command is received from the user the apparatus will be able to carry forward the test on its own. There may also be options for preloading commands to the apparatus or by plugging a memory device into the apparatus with preloaded commands, then the apparatus will be able to work standalone. The apparatus may also have provision to connect with the DUT and get information from it dynamically and adapt the test case based on that. The communication with the apparatus may not be platform-specific, so any language, any software infrastructure is highly compatible with the apparatus.

Further, the apparatus may be equipped with a vision system to continuously monitor the response of the DUT. The vision system may consist of multiple cameras placed away from the DUT to get a global view of the entire workspace of the system, and multiple local cameras placed close to the DUT to get a close view of the DUT and extract the tiny information from the DUT for example tilt/movement of DUT, the latency of the software and hardware of the DUT, screen defect, frame skipping, etc. The vision system may also include a thermal imaging camera to measure the thermal performance of the DUT over various test conditions. There may be multi-dimensional tracking cameras also to evaluate various DUT parameters. The vision processing system may also be within the scope of the apparatus control system or may be distributed to the cloud or hosted service or locally tethered computing platforms based on the application and data handling needs. If the workspace is very large, the apparatus may be using a stitching technique to create the workspace image from small images taken from multiple cameras. The vision system may also have the ability to intelligently identify the content presented over the DUT using any vision processing techniques such as image comparison, OCR, pattern matching, object identification, color identification, etc. There may be provisions for external lighting sources in case of a working environment with poor lighting conditions, this light may be turned ON/OFF by the system intelligently based on the lighting condition or controlled manually through the instruction feed by the user. There may also be provisions to enhance the DUT images taken by the vision system in case of poor lighting conditions. There may be specific wavelength lighting and cameras for the detection of cracks, imperfections, dirt, etc. over the DUT. Also, there may be a mechanism inside the apparatus to tilt, rotate, and move the camera system and the DUT to get a more detailed view of the DUT from different angles.

The apparatus may have the ability to fetch data from the DUT through some data communication. With this, it can close loop a test case without using a vision system. The apparatus may be able to fetch the required data from the DUT or maybe by listening to the data stream from a DUT. This can be configured in the apparatus based on the features of DUT. If the DUT doesn't support a data feed output, then the apparatus will be able to be close-looped with the vision camera and its controller.

The apparatus can be deployed in multiple work environments such as a tabletop or a production line. The unique C-shaped design of the apparatus is made such that the same apparatus can be used in both development testing and production testing of the DUT without any hardware change. This design also favors accommodating DUTs even bigger than the apparatus under the end-effector module.

During the verification and validation process of any DUTs, there may be specialized mechanical movements needed to be given to specific DUTs. This includes actuating an interface element that is away from the end-effector and feeding any type of verification signal into the DUT like Bluetooth, radio modules, signal simulators, etc. For all these needs there may be a common or separate interface within the apparatus with which a user can attach such special modules and users can easily add up features without any alteration to the existing apparatus. This modular nature of accessories makes it simple, easy, and at the same time more realistic.

A method to author functional testing of a device wherein the simulation apparatus consisting of a position controller and actuation apparatus can be manually placed at the desired location on the device under test and appropriate commands to simulate various device scenarios may be recorded in the controller. The command thus recorded may be subsequently used to generate a test script to enable automation of a test case or sent to a remote-control unit for building test case scenarios. The signal to teach the apparatus may be fed to the controller by means of any input devices such as switches, screens, joysticks, etc.

The apparatus is capable of generating scripts from these button clicks or using mouse clicks through the software suite guided by a vision system.

To implement the method of functional testing with repeatability and accuracy the apparatus consists of pluralities of mechanisms and fixtures to enable fastening of the device under test of any given size, in appropriate orientations such that it enables the simulation apparatus to actuate various 'devices under test' interfaces. These fixtures have multiple features other than the mounting of the DUT, such as side switch actuation, tilt, or rotation of the DUT.

Through the inbuilt HMI of the apparatus, or by using the software suite, a user can store the key values of a DUT such as height for the various interfacing elements in the DUT, force for each interface element in the device (touch screens or hard buttons) need to operate the power supply for that particular device, positions of each interfacing elements within the DUT, etc. All this device-specific information can be stored by using the inbuilt apparatus HMI under DUT persona memory or through the software suite. If we are making such device personas, we can add more values like boundary conditions for the operations of that particular device or the duration of touches, force for each element (touchscreens, buttons, switches, etc), and the angle at which the stylus need to do the actions, retracting finger back positions after a touch (action). The same user or multiple users can access this DUT persona so it will reduce the time & repeat jobs after a DUT change or reuse the same device at a different point of time or location within the same test group.

The method wherein testing of a device functionality is validated using a feedback control loop for which data is obtained from the device under test using configurable GPIOs in the simulation apparatus. This method of feedback control loop may be utilized for independent verification and validation of the system and take corrective actions during a verification and validation process. This also provides a fast and reliable feedback loop with which a high-speed sensing of some condition can be achieved such as latency measurement, and for which the latency induced by the simulating apparatus will be constant all the time.

An API-controllable configurable power supply is provided to power the test device. During the fictional testing, this can be controlled programmatically to provide a wide range of situations like the real world making it easier for a test engineer to do the validation.

A system for device inspection consists of a simulation enabler which may consist of a mechanism to achieve 2 dimensional motions in the plane parallel to the device under the test phase. It also comprises an HMI for instant control. The 2D motion apparatus may be of various forms as per the needs of the device under test and the workspace required. This apparatus may be actuated using rotating motors coupled together using harmonic gears or maybe belt-driven or lead screw coupled or gantry-based linear actuators. A software interface handshake or a hardware switch configuration may be used to identify the manipulator currently coupled as the position controller of the simulation apparatus.

Other features/components of the invention include but are not limited to a utility stand, wire routing for the external interface, movable camera mount, lifting points, door sensing, vision-based workspace navigation, non-intrusive measurements, automatic menu navigation, DUT-specific accessories, rig/system controller form factor (tabletop mountable, as a result of using an embedded platform), Finger Module, Multi-finger Stylus, Force sensing, Force Limiting and DUT Safety, Haptics Temperature Sensing, Automated Tip Stylus changing, Multi-finger System (Passive and Active), Touch status LED, Azimuthal and tilt simulation stylus calibration technique, Finger module mechanical interface, Plug and Play stylus, Fingertip variation for different DUT interface, DUT Level mapping, Curved DUT interface, Side switch actuation.

FIG. 22 illustrates a flowchart of a method 2200 for verifying and validating smart connected Human-Machine Interface (HMI) devices using a robotic system, in accordance with one or more example embodiments. FIG. 22 is explained in conjunction with FIG. 1-FIG. 21. The method 2200 includes a step 2202 of replicating human finger interactions by utilizing a multi-finger modular robotic module with variations such as a glove, water, sweat, and impurities. The method 2200 includes a step 2204 of simulating a human finger's interaction with a device under test (DUT) through a haptic module by applying precise force for predefined durations, allowing performance assessment based on the applied force. The method 2200 includes a step 2206 of ensuring continuous and reliable operation of the robotics system by utilizing a finger actuator that delivers speed, accuracy, and dependable finger movements throughout its life cycle. The method 2200 includes a step 2208 of employing a plurality of vision cameras for vision-guided navigation and visual verifications during the verification and validation process. The method 2200 includes a step 2210 of enhancing the accuracy of computer vision through controlled ambient light within the test chamber environment using vision lights. The method 2200 includes a step 2212 of strategically positioning vision cameras by rotating the multi-finger modular robotic module with a finger rotary module to specific angles for optimal field-of-view coverage. The method 2200 includes a step 2214 of executing a plurality of tasks related to the verification and validation process. The plurality of tasks comprising, pipetting, pick and place operations, and vision inspections using a Cartesian robotic arm. The method 2200 includes a step 2216 of monitoring and adjusting settings on a test rig through an onboard user interface for efficient operation during the verification and validation process. The method 2200 includes a step 2218 of involving an incorporation of a plurality of universal mounting guides, facilitating the mounting of vertical and horizontal Cartesian robots without necessitating any hardware modifications or additions. The method 2200 further includes a step 2220 of involving an integration of a finger module cable chain, enhancing cable routing reliability and preventing tangling and hanging cable occlusion for vision cameras.

Thus, the present robotic system provides a complete test automation platform instead of test automation components. The apparatus along with the software can replicate real human test scenarios at normal and boundary conditions to ensure the reliability and quality of the DUT. The present robotic system is used for applying defined pressure on the surface and simultaneously measuring different parameters including vibration happening at the area where the pressure is applied. The robotic system is also able to replicate scenarios for hover where there is no physical contact made between the stylus and the device. The robotic system combines these with the vision and kinematics algorithms, the system replicates hand/finger gestures like touch, swipe, tap, scroll, pinch, zoom, rotate, sign, draw, etc. The continuous pressure monitoring during the contact cycle makes it work perfectly on curved screens/surfaces. The rig design is capable of accommodating large-size devices or multiple types of devices or replicating a completely connected device in real-world scenarios. With specially designed doors, the rigs are capable of being utilized for both production testing and development testing. The Smart HMI system monitors the system's health and SOP violations and provides advance maintenance alerts for uninterrupted cycles of operation. The accessory expansion port provisions for future needs where further systems/components need to be integrated with the existing system to increase the coverage or capability of the system. The integrated computer/machine vision system is utilized for recording and evaluating the characteristics of the screen and the content within the screen. Specialized characterizations like latency, optical character recognition, Icon detection, automatic screen area identification, automatic screen navigation, etc. are part of the system. Thermal cameras are utilized for identifying the head dissipation within the devices during the testing cycles and charging cycles.

The robotic arm height can be adjusted automatically to accommodate devices with varying thicknesses (mobile phones to infotainment/medical devices). The robotic system is capable of automatically changing between various types of stylus for replicating different test scenarios like making the touch with a glove, making touch with sweaty hands, making touch with different sizes of fingers, etc. With the accessory expansion and modular design, all future needs can be addressed without many hardware limitations.

Unless otherwise defined, all terms (including technical and scientific terms) used in this disclosure have the same meaning as commonly understood by one of ordinary skill in the art to which this disclosure belongs. In this specification, "mobile phone" and "smartphone" are interchangeable as are "tablet" and "smart tablet." It is to be understood that the phrases or terms employed by the present invention are for description and not for limitation. As will be appreciated by one of the skills in the art, the present disclosure may be embodied as a device, system, method, or computer program product. Further, the present invention may take the form of a computer program product on a computer-readable storage medium having computer-usable program code embodied in the medium. The present systems and methods have been described above with reference to specific examples. However, other embodiments and examples than the above description is equally possible within the scope of the present invention. The scope of the disclosure may only be limited by the appended patent claims. Even though modifications and changes may be suggested by the persons skilled in the art, it is the intention of the inventors and applicants to embody within the patent warranted heron all the changes and modifications as reasonably and properly come within the scope of the contribution the inventors and applicants to the art. The scope of the embodiments of the present invention is ascertained with the claims to be submitted at the time of filing the complete specification. Method steps can be performed in any order unless required otherwise by the context. In the specification and claims, a feature mentioned in the singular (e.g., using "a" or "an") will be deemed to have an "at least one" or plural construction except where the context indicates such construction is unworkable. A person of skill in the art will also recognize that the embodiments discussed herein are reconfigurable and within the intended scope. For example, the dependent claims from one independent claim or dependent claim can be similarly made to depend on a different independent claim and/or dependent claim, unless prohibited by the context. In addition, as would be appreciated by a person of skill in the art, certain features or elements of a claim can be mixed and matched with other features or elements, even if not presented together at the time of filing. Similarly, as would be appreciated by a person of skill in the art, data, outputs, and readings from different described sensors, user inputs, and other sources can be used together, even if not presented together at the time of filing. The term "and/or" in a list means all list items present, some list items present, or one of the list items present unless such construction is limited by the context. Positional and directional terms described in this specification may be understood to be different than shown or described and should not limit the variations of embodiments possible from the claimed features that a person of ordinary skill in the art would understand from the specification, figures, and claims.

What is claimed is:

1. A robotic system for verification and validation of one or more smart connected human-machine interface (HMI) devices, comprising:

a multi-finger modular robotic module to replicate bare human fingers, and one or more of: human fingers with glove, water, sweat, and impurities;

a haptic module to simulate a human finger over a device under test (DUT) by applying a precise force required for a predefined duration and determine the performance of the robotics system based on the precise force and haptic feedback;

a finger actuator to provide speed, accuracy, and reliable finger movement throughout a life cycle which makes the robotics system capable of running continuously;

a plurality of vision cameras configured for vision-guided navigation and visual verifications;

a plurality of vision lights configured for the vision cameras to control the ambient light for better accuracy for a computer vision as well as controllability in a test chamber environmental light;

a finger rotary module to rotate the multi-finger modular robotic module to a specific angle and aesthetically position the vision cameras on a specific region for the maximum field of view coverage;

a cartesian robotic arm compatible with one or more of the multi-finger modular robotic module, a plurality of pipetting modules, a pick and place module, a vision inspection module, or a combination thereof;

an onboard user interface enables monitoring and adjustment of various settings on a test rig; and a L-shaped door to provide wide openings to the robotics system providing an operating access to a user to mount a test device.

2. The robotic system as claimed in claim 1, further comprising a plurality of universal mounting guides for vertical and horizontal cartesian robots mounting without any hardware change or additions.

3. The robotic system as claimed in claim 1, further comprising a finger module cable chain to provide reliability in cable routing and prevent tangling and hanging cable occlusion for the vision cameras.

4. The robotic system as claimed in claim 1, further comprising a homing module to provide a positional accuracy and repeatability for the finger actions.

5. The robotic system as claimed in claim 1, further comprising a status indicator using multicolor light sources positioned on the top of the test rig.

6. The robotic system as claimed in claim 1, further comprising a heavy-duty rig table to provide one or more of: a solid mounting provision for the robot rig; cable additional test support equipment such as API controllable power supply, signal generators, analyzers; a multi-functionality anti-vibrating caster wheel with manual thumb wheel nut open-ended wrench for leveling adjustment and on-premise test system movements; an inbuilt power distribution unit to support any standard power socket along with electrical isolator unit; a wide open front and back door for flexibility of device mounting, organizing, and cable routing; a plurality of customizable cabling racks and grommets; and an adjustable rack-mountable equipment mounting rail.

7. The robotic system as claimed in claim 1, further comprising a plurality of rack mounting rack plates to provide convenient positioning of a plurality of test support devices.

8. The robotic system as claimed in claim 1, further comprising a plurality of multi-functional anti-vibrating caster wheels to provide solid placement of the test device and its manual thumb wheel nut open-ended wrench helps leveling adjustment.

9. The robotic system as claimed in claim 1, further comprising an emergency stop to halt the robotics system manually if any unforeseen issues happen to the DUT of the equipment.

10. The robotic system as claimed in claim 1, further comprising a test device barcode printer to create a unique barcode for each test device while creating the device library using the software suite.

11. The robotic system as claimed in claim 1, further comprising a selective compliance assembly robot arm (SCARA) with a single finger module configured for an HMI testing automation to accommodate the plurality of end effectors.

12. The robotic system as claimed in claim 1, further comprising a plurality of manipulator connectors to connect the robotic manipulator to the test rig.

13. The robotic system as claimed in claim 1, further comprising a SCARA robot with a two-finger module for HMI testing automation to accommodate the plurality end effectors.

14. The robotic system as claimed in claim 1, further comprising a robot height adjustment module to adjust an operating height of the robots with respect to the DUT bed to mount a plurality types of DUTs to the test rig.

15. The robotic system as claimed in claim 1, further comprising a voice assistant test simulator to simulate human kind of voice feedback for voice assistance testing as well as capture voice response from the test device.

16. The robotic system as claimed in claim 1, further comprising an in-built DUT power supply for the DUTs (test device).

17. The robotic system as claimed in claim 1, further comprising a local camera mounting bracket for the SCARA to mount an additional vision camera to monitor the changes happening in the test device.

18. A method for verifying and validating smart connected Human-Machine Interface (HMI) devices using a robotic system, the method comprising:

replicating human finger interactions by utilizing a multi-finger modular robotic module with variations such as a glove, water, sweat, and impurities;

simulating a human finger's interaction with a device under test (DUT) through a haptic module by applying precise force for predefined durations, allowing performance assessment based on the applied force;

ensuring continuous and reliable operation of the robotics system by utilizing a finger actuator that delivers speed, accuracy, and dependable finger movements throughout its life cycle;

employing a plurality of vision cameras for vision-guided navigation and visual verifications during the verification and validation process;

enhancing the accuracy of computer vision through controlled ambient light within the test chamber environment using vision lights;

strategically positioning vision cameras by rotating the multi-finger modular robotic module with a finger rotary module to specific angles for optimal field-of-view coverage;

executing a plurality of tasks related to the verification and validation process, wherein the plurality of tasks comprising, pipetting, pick and place operations, and vision inspections using a Cartesian robotic arm; and monitoring and adjusting settings on a test rig through an onboard user interface for efficient operation during the verification and validation process.

19. The method as claimed in claim 18, further comprising a step of involving an incorporation of a plurality of universal mounting guides, facilitating the mounting of vertical and horizontal Cartesian robots without necessitating any hardware modifications or additions.

20. The method as claimed in claim 18, further comprising a step of involving an integration of a finger module cable chain, enhancing cable routing reliability and preventing tangling and hanging cable occlusion for vision cameras.

* * * * *